US007853881B1

(12) United States Patent
Aly Assal et al.

(10) Patent No.: US 7,853,881 B1
(45) Date of Patent: Dec. 14, 2010

(54) MULTI-USER ON-LINE REAL-TIME VIRTUAL SOCIAL NETWORKS BASED UPON COMMUNITIES OF INTEREST FOR ENTERTAINMENT, INFORMATION OR E-COMMERCE PURPOSES

(75) Inventors: Amr Fouad Aly Assal, San Mateo, CA (US); Raymond Marcelino Manese Lim, Los Altos Hills, CA (US); Man-Ho Lawrence Lee, San Jose, CA (US)

(73) Assignee: ISQ Online, Los Altos Hills, CA (US)

( * ) Notice: Subject to any disclaimer, the term of this patent is extended or adjusted under 35 U.S.C. 154(b) by 753 days.

(21) Appl. No.: 11/825,021

(22) Filed: Jul. 3, 2007

Related U.S. Application Data

(60) Provisional application No. 60/818,672, filed on Jul. 3, 2006, provisional application No. 60/836,273, filed on Aug. 8, 2006.

(51) Int. Cl.
*G06F 13/00* (2006.01)
*G06F 15/00* (2006.01)
(52) U.S. Cl. ....................... 715/734; 715/736
(58) Field of Classification Search ......... 715/734–736, 715/763–765, 851–855, 741–744
See application file for complete search history.

(56) References Cited

U.S. PATENT DOCUMENTS

| | | | |
|---|---|---|---|
| 7,016,307 B2 | 3/2006 | Vasudev et al. | |
| 7,069,308 B2 | 6/2006 | Abrams et al. | |
| 7,117,254 B2 | 10/2006 | Lunt et al. | |
| 7,188,153 B2 | 3/2007 | Lunt et al. | |
| 2005/0086605 A1* | 4/2005 | Ferrer et al. | 715/745 |
| 2006/0247940 A1 | 11/2006 | Zhu | |
| 2007/0037574 A1 | 2/2007 | Libov et al. | |
| 2007/0038594 A1 | 2/2007 | Goodwin et al. | |
| 2007/0106551 A1 | 5/2007 | McGutchen | |
| 2007/0112719 A1 | 5/2007 | Reich | |
| 2007/0112761 A1* | 5/2007 | Xu et al. | 707/5 |

\* cited by examiner

*Primary Examiner*—Cao "Kevin" Nguyen
(74) *Attorney, Agent, or Firm*—Barry N. Young

(57) ABSTRACT

In a multi-user online real-time network in which users access content associated with a plurality of social networks related by common communities of interest, an interactor client application is embedded in content pages accessed by a user, and the user is provided a list of other users and the content pages in the related social networks that they are accessing. The inteactor client application cooperates with an interactor server application on a network server to enable a user to view the content being accessed by multiple selected ones of the other users, and to interact with the other users online and in real time.

25 Claims, 32 Drawing Sheets

MULTI-USER ON-LINE REAL-TIME VIRTUAL SOCIAL NETWORKS BASED UPON COMMUNITIES OF INTEREST FOR ENTERTAINMENT, INFORMATION OR E-COMMERCE PURPOSES

CROSS-REFERENCE TO RELATED APPLICATIONS

This application claims the benefit of U.S. Provisional Applications No. 60/818,672, filed Jul. 3, 2006 and No. 60/836,273, filed Aug. 8, 2006.

BACKGROUND OF THE INVENTION

The present invention relates generally to on-line computer networks, and more particularly to social networks where members may interact online and live (in real-time) in the context of some particular content or activity.

To find any general information or content, or to purchase a product on-line using a computer network, such as the World Wide Web (Internet) a user has several well-known options. He may utilize a search engine such as Google, Yahoo or Overture, etc., and be presented with hundreds of potential websites that could be a source of the information, content or product, and through which the user must navigate to seek relevant information; or if a search site supports sponsored links, the user can click on any of those sponsored links that might have the information, content or product sought. If a source of the content, product or information is known, the user can enter the URL for that source (website) into a browser for access. If the information, content or product is not found then the user can utilize search engines to attempt to locate it. Some websites such as AOL, Yahoo, etc., have directories of categories and subcategories that the user can also navigate to try to find the information, content or product of interest.

Another approach is clicking on a banner presented to the user on some web-site, which might have the information, content or product sought. Additionally, the user can click on a URL embedded in some other site or email to access the site containing the content/information that the user is looking for.

While the above approaches may work to locate the particular information, content or product being sought, these and most other known approaches are inefficient, time-consuming, and may not be capable of locating the precise information the user is seeking. In addition, the user cannot know if the information he does receive is up-to-date, or whether there may be yet another site with better or more relevant information. In addition, none of the known approaches enable a user to interact with others who may have actual specific knowledge or experience of interest, or interact in real-time with an actual live expert on the information. Whereas some sites, primarily e-commerce sites that sell services or products, offer an option to chat with a live person, most limit discussion to answering support or service questions about their specific products and services, and they do not offer advice or recommendations about other products. If, for instance, the user is looking for specific expert information on art paintings by Monet, or to obtain advice and recommendations, he/she cannot lookup such information or have a discussion with an actual live person to whom he/she can ask questions. Existing approaches do not typically permit access other humans, potentially the best source of information in real-time. Typical search engines do not lend themselves to detailed queries of the type that can locate certain precise information, content, or products that may be of particular interest to a user, or refer the user to locations where it may be obtained.

In addition, current social networks are web-based (server based) applications and do not have a real-time client component similar to what instant messaging (IM) applications (for example, Yahoo Messenger) offer. There is no way for a social network member to tell from signing on to any social network site who from his/her network universe is online on a given site. Social networks today are mostly for asynchronous interaction and facilitation of introduction. They do not promote real-time online interactive activities.

IM programs are disjoint from the content and the user interest.

What is needed are systems and methods that address the forgoing and other known problems associated with accessing specifically desired or sought content, or information on general topics or products quickly, efficiently, through and by interacting with others having the same interests and in the process bringing the online experience closer to a real-word physical experience, and it is to these ends that the present invention is directed.

DEFINITIONS AND TERMINOLOGY

As used in this document, the following terms have the following meanings, unless stated otherwise.

Content: Any material such as text, graphics, video or/and audio delivered to a user online (Internet or any other network) through a website.

FIG. 1a-FIG. 1f are examples of how such content can be organized and structured. Content organization may be physical or virtual. FIG. 1a shows a representation of unrelated content 102 that could be served from the same site or from different sites. FIG. 1b shows a representation 110 of a hierarchical and hyperlinked organization of content for a single website that may be served by one or several server farms. In this case content 112 represents a home page and 114 represents content pages at a second level that is hyperlinked to content 112, and so on. FIG. 1c illustrates an organization 124 of related content 110 when served and hosted by a single server 122. FIG. 1d illustrates a virtual organization 132 of related content 136 that is hosted by multiple physical servers 134. As shown, a website's related content, may be hosted served by several servers. FIG. 1e shows an organization in which the related content having a virtual structure is on servers that are not in the same physical location. Content organization 142 may be similar to organization 132 in which related content may be hosted by a plurality of physical severs, whilst organization 144 represents related content 136 hosted on a physically segregated server. FIG. 1f shows a content organization having mirrored and/or redundant servers 122, 152 in which the same content can be served from one or more server farms. This may be used for load balancing and for high service availability. Any of the foregoing organizations and structures, or others, may be used to deliver content to an end-user 164. FIG. 1g is a representation of a user accessing content via a device 162 containing a processor and connected to a network 170, such as the Internet. An application 166, such as a browser running on the device may display the content on a screen.

Social Network: Is a community of members or other individuals that share similar values or interests. Each member typically comes with a personal profile, which may contain demographics, psychographics or professional information. Each member may have no, a single, or a plurality of connections or relationships with other members within the social network. Each member may engage in activities, such as email communications, information sharing, etc., with other members. These individuals may grow the social network community by inviting others to connect to their community. A social network also includes individuals who engage in some common real-time activities online and share some common context. This includes, but is not limit to, shopping at the same online e-merchant website, browsing the same or related content pages, engaging in an online event or activities at the same time. A social network may extend to activities and individuals engaging in activities around a web page or an object referred to by such a web page. As used herein, the term "users" includes members, guest members, and others accessing a social network, and the term "social" is used in broadest sense to refer to communities of interest.

Sliver-interest Social Network: A social network where the members have a specific common interest. In this case the profile may be very limited. Examples may be a social network for merlot wines, or it could be as specific a brand of merlot, e.g., Beringer merlots. Unless specifically stated otherwise, a social network as used in this document refers to a sliver-interest social network. In addition a sliver-interest social network can also be defined by a common sliver activity or content. Unless specifically stated otherwise or apparent from context, the term "social network" in this document refers to a sliver-interest social network.

FIG. 2 illustrates examples of various structures of social networks and sliver-interest social networks of the type with which the invention may be employed. In FIG. 2a, a set 210 of social networks 212 for animals map one-to-one to a set 202 of real life animal objects, and maintain a hierarchy 214 corresponding to the real hierarchy 206. Subsets of the social network 210 for animals are social networks 212 for dogs, cats, etc. These subsets map to real life animal objects 204, and hierarchical relationship 206.

FIG. 2b is another representation of social networks 230 that each map to a single page (content) 222 on a website. Social networks 232 each can be setup for each existing content page 222 (A-D) can be setup for each social network 232, and may mirror the hierarchy of content on a website 220. Thus, social network 232 maps and mirrors the pages of the website 222.

Finally, FIG. 2c at 250 illustrates how the relationship 254 among sliver-interest social networks 252 mirrors a predefined or logical relationship 244. People that hike (242) share a common interest, so they form a social network 252. Subsets of those that hike are those specifically interested in other activities associated with hiking, such as cooking or backpacking, or location, e.g., Yosemite. Each subset can map to a sliver-interest social network 252.

Interactor application: A software application that enables online users who may be members of social networks to communicate and exchange information with one another or in groups and in real-time.

Real Time Social Network: A social network where the members share a common and agreed-upon interest as defined in a sliver-interest social network and whose members can interact with one another using an interactor application. Members of a real-time social network can, though not necessarily, engage in the same real-time activity. In this case, the individuals' activities and the associated content of the social network may be a specific interest context and/or object. Examples include an online social gathering for discussions about merlot wines or a specific a brand of merlots, e.g., Beringer merlots.

Interactor Zone (or Network): FIG. 3c shows a graphical representation of an interactor zone 330. An interactor zone is an organization of a logical collection of pages within which users may interact in a collection of related real-time social networks. As will be explained, any content page 304 (or 100-154 of FIGS. 1a-1f) may include an embedded interactor client software application, also referred to as an interactor console that enables on-line real-time access to social networks and interaction with other users. The non-inclusion of such an application does not exclude a page from an interactor zone. A content page may be mapped to only one interactor zone.

Social Network Member or Interactor Network User: Is a registered user of the social networks corresponding to an interactor zone, or a guest that has logged into and is accessing content page from a given interactor zone. A social network member may be a guest who has been granted temporary access to some or all member capabilities and functionality of the interactor system.

A Member's Social Network Universe: The set of members to which a given member has a specific relationship at a given time. That universe may be defined by specifying a degree of separation (DoS) from the given user. In other words, only members being in N (an integer equal tot or larger) connections away from the given member are considered to be in such given member's universe. Such a universe may be contextualized and reduced with given filtering criteria.

Privacy level: Is a parametric setting allowing a member of a social network to specify criteria for determining what and to whom he/she is available. For example, a member may choose to be invisible to all other users, to only a subset of them, or only for certain content or purposes. The member at may change the criteria settings. Specific messages and states may be customized by the member and rendered by a system to other users. Privacy levels may be filtered or customized on a target individual or target group basis.

SUMMARY OF THE INVENTION

The invention affords methods and systems that enable a user to find out particular information, content or products of interest by interacting with any of the members of a social network that share the same interest, or that are connected to the user through a known set of the social network members, or because of the activity they are engaged in, or content they are viewing at a given time.

The environment of the invention may comprise a plurality of social networks, each associated with some specific interest, such as hiking—Yosemite as shown in FIG. 2c, or a plurality of general social networks where members share multiple interests under a broader classification, such as hiking in FIG. 2c, or a plurality of social networks where members share multiple related interests, such as hiking+cooking in FIG. 2c. Members or unregistered guests of the social networks share a single or a plurality of common implicitly or explicitly defined interests. They could be simply sharing or viewing related content as members of a sliver-interest social network. The real-time social network solution of the invention may comprise hardware and software, including a client application software component, or console, either running as a standalone application on a client user device or that is accessed from a content page and presented to the user. This client application software enables a member to login to a server application and have access to one or a plurality of social networks of which he is a member, and to determine visually, through a keyword search, or using predefined filters and members' privacy levels, which other members within his/her set of social networks universe is online and their current "locale" on a website, i.e. the logical reference to the content they are viewing. Online members do not have to be at the same physical location, as long as they are online, i.e. accessing the Internet, and in the same zone. Any member user logged on to the network may carry out activities or interact in real-time, e.g., ask questions, chat, share profiles, surf together, share an activity, etc., with other online members who are in the same zone. They may also interact with each other in a specific social network based on their privacy settings for that network and of that member.

In one aspect, the invention affords a method of interacting with users accessing content pages in a computer network in which a first user accesses a content page that has an associated interactor client application. The first user invokes the interactor client application, and displays the identities of other online users accessing other content pages. The interactor client application enables interaction between the first user and selected ones of the other users.

In another aspect, the invention provides a method of online interacting with users logged onto social networks, in which a user accesses a first content page of a social network that has an associated interactor client application that the user invokes. A list of other users that meet certain predetermined criteria established by the first user is displayed, and the interactor client application enables interaction between the user accessing the first content page and other users selected by the user.

In yet another aspect, the invention affords a computer in which users access content pages associated with respective social networks using a device having a processor and a memory for storing programs that control the operation of the device. The control programs access a selected content page having an associated interactor client application that enables interaction between users. The interactor client application displays a list of other users accessing content pages that are related by said common subject matter, and enables online real-time interaction between one user and other users within a predetermined locale.

BRIEF DESCRIPTION OF THE DRAWINGS

FIG. 1, comprising FIG. 1b showing related and hyper-linked content pages that share the same domain name and are hosted by the same physical server(s) or server farm(s); FIG. 1c showing related content pages hosted by one server; FIG. 1d showing related content pages hosted by a plurality of physical server(s); FIG. 1e showing related content pages hosted by physically segregated groups of servers; FIG. 1f showing related content pages mirrored by physically segregated groups of servers; and FIG. 1g showing a user accessing content pages through the Internet using a browser;

FIG. 2, comprising FIG. 2b showing a structured social networks mirroring content page relationships; and FIG. 2c showing a structured social networks mirroring pre-defined abstract or logical relationships;

FIG. 3, comprising FIG. 3b showing sample placements of an interactor GUI within a content page; and FIG. 3c showing an interactor zone as comprising a virtual structure of related or non-related content pages in a collection, and content pages not within the collection;

FIG. 4, comprising

FIG. 5, comprising

DETAILED DESCRIPTION OF PREFERRED EMBODIMENTS

The present invention addresses the foregoing described problems of enabling on-line real-time interaction with other members or users of a social interest group associated with a particular context or community of interest, such as particular content, information about particular products, services, etc., using an online computer network such as the Internet, and will be described in that context. It will be appreciated, however, that this is illustrative of only one utility of the invention and that the invention has applicability to other areas and problems.

More particularly, as will be described more fully, the invention affords systems and methods (referred to as "interactor" systems and methods) that enable members or guests in a real-time social network in an interactor zone to interact online and live in real-time with one another in the context of some common interest. A user may simultaneously see and share the same content and/or be aware of each other's locale on a website within the same interactor zone. Content that is available and accessible from other nodes (computers or any other networked devices such as a personal digital assistant i.e. a PDA or mobile phone) on a computer network, such as the Internet, may form the basis of a social network. Additionally, the method and system enables one user to register/join (basically become a member or a guest-member) of a social network or networks (for an interactor zone) and access and interact with other network members in real-time and/or share an activity or content with one or more of them. If one user is not online, certain types of interactions may be stored and made available when the offline user reconnects with the interactor zone by logging in.

The system and method allows a member of a social network to determine which members of the social network are online and available for some type of real-time online interaction, such as concurrently sharing information and/or communicating with typed text messages or voice messages over the network, or any other simultaneously available communication network. The purpose of the interaction may be for any human interest or discovery of another human. For example the real-time online interaction between a member and one or more other members could be asking questions, getting responses and chatting, surfing, shopping, and visiting a site with one or more of other members of a social network in real time.

Interactor Client Application Embedded in a Content Page

Figure 5A:
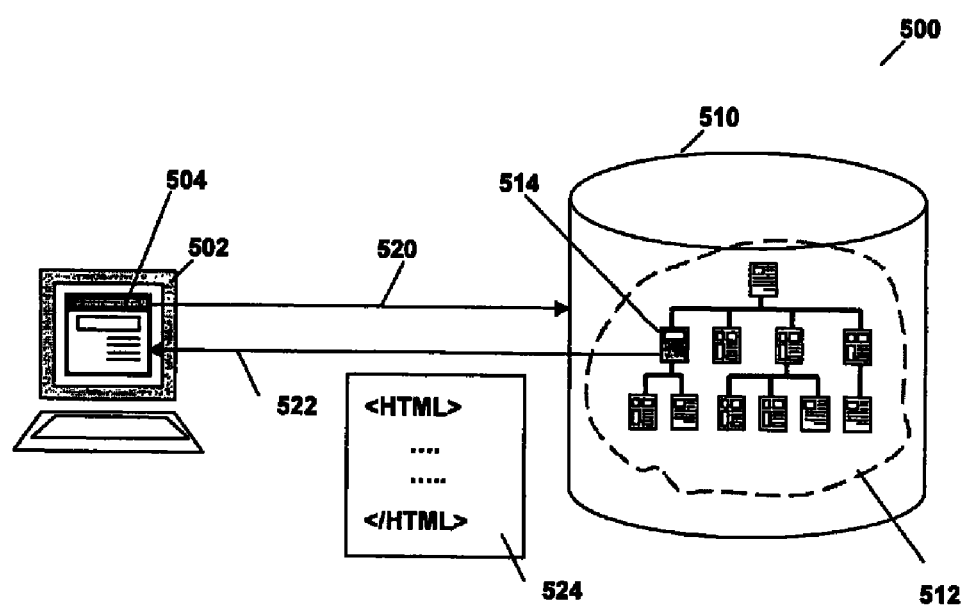
FIGS. 5a-5d, are diagrammatic views contrasting a typical un-enhanced web-server's response to user's client browser (FIG. 5a), with different alternative ways a web server may embody interactor script (code) in content page source code (FIGS. 5b-5d)
Figure 5B:
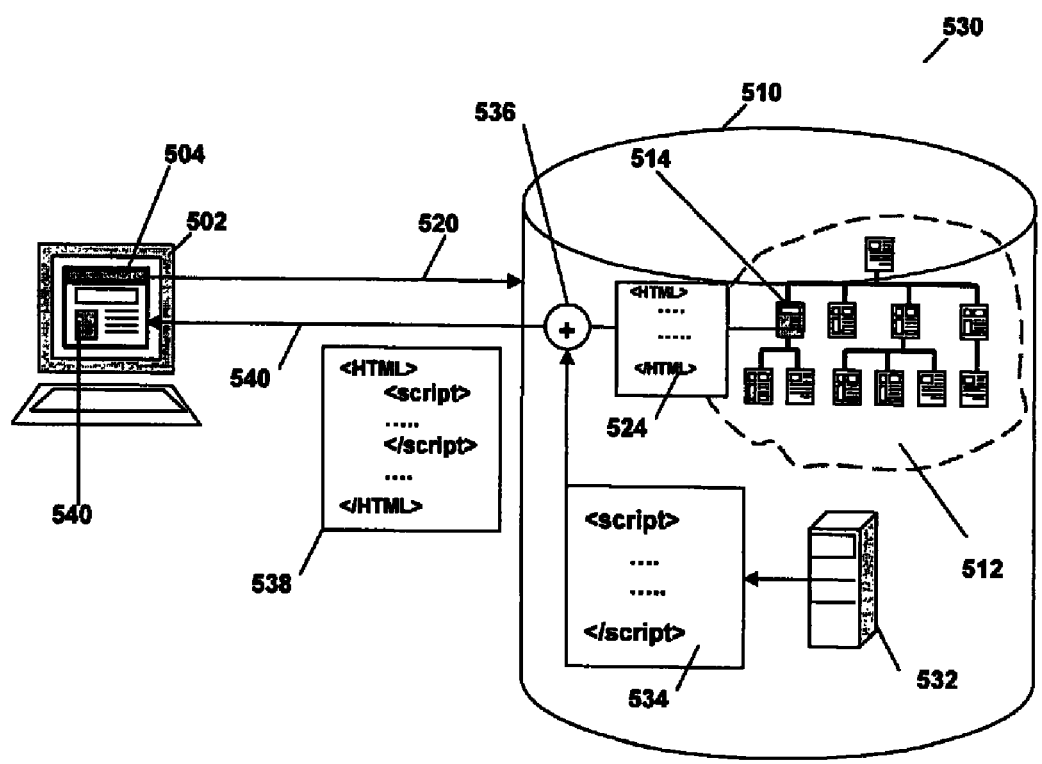
Figure 5C:
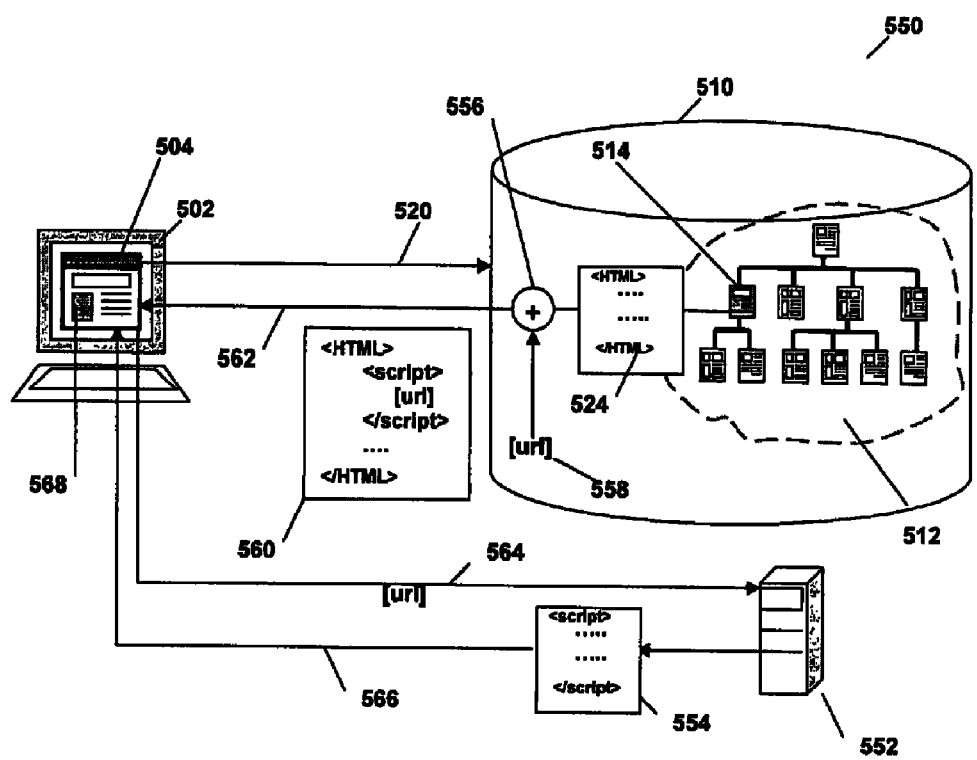
Figure 5D:
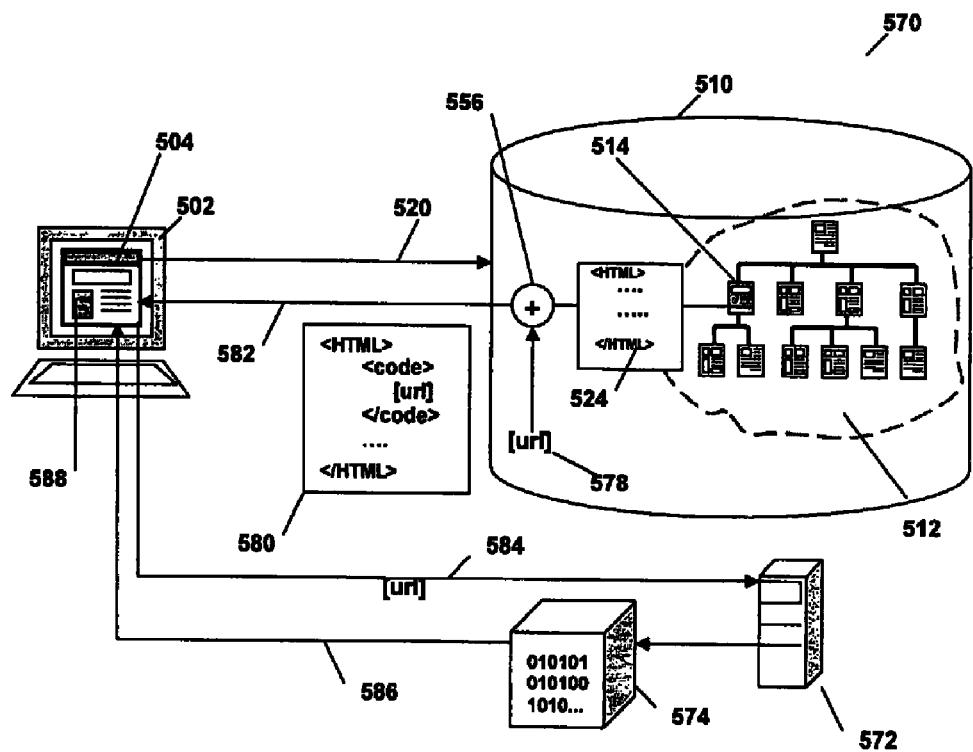

FIG. 5a illustrates an example of a process 500 showing how a web server (process 510) typically delivers a content page 514 to a user's browser 504 running on a client device 502, such as a PC, in response to a user request 520. In this case, only the HTML representation of the content page 524 is delivered to the user's browser. The invention may augment this process to enable online interaction in various ways, as shown by the examples of FIGS. 5b-5d. In each case, an interactor server 532, 552 and 572 augments and embeds a script 534, or a reference to a script 534, 554, or a reference to platform-independent compiled code 574 in the HTML representation of the content page that is delivered to the user based on the user's request 520. This embedded script, i.e., interactor code, is depicted in rendered form as 540, 568 and 588, respectively, in these different cases within the client browser 504.

In FIG. 5b, the interactor in script form may be embedded by server 532 at 536 into the original content 524 requested by the user before the combined content 538 is served to the user's browser 504. In FIG. 5c, the URL reference 558 to the interactor script 554 may be embedded in the original content 524 requested at 520 by the user, and the combined content 560 forwarded to the user browser, which may use the URL to obtain the script 554 from the interactor server 552. The script is sent through reply 566 to the browser 504.

An alternate process 570 of embedding interactor process code in an original content is shown in FIG. 5d. In this implementation, a URL reference 578 to interactor platform-independent compiled code 574 may be embedded at 556 with the original content 524 forwarded to the end user browser 504. Browser 504 upon once having received the content page containing a reference 578 to either the script form of the interactor code in process 550 or to the platform-independent compiled code form of the interactor code in process 570, then may automatically make a separate request to the interactor server 552, 572 for the referred script or code.

Figure 6:
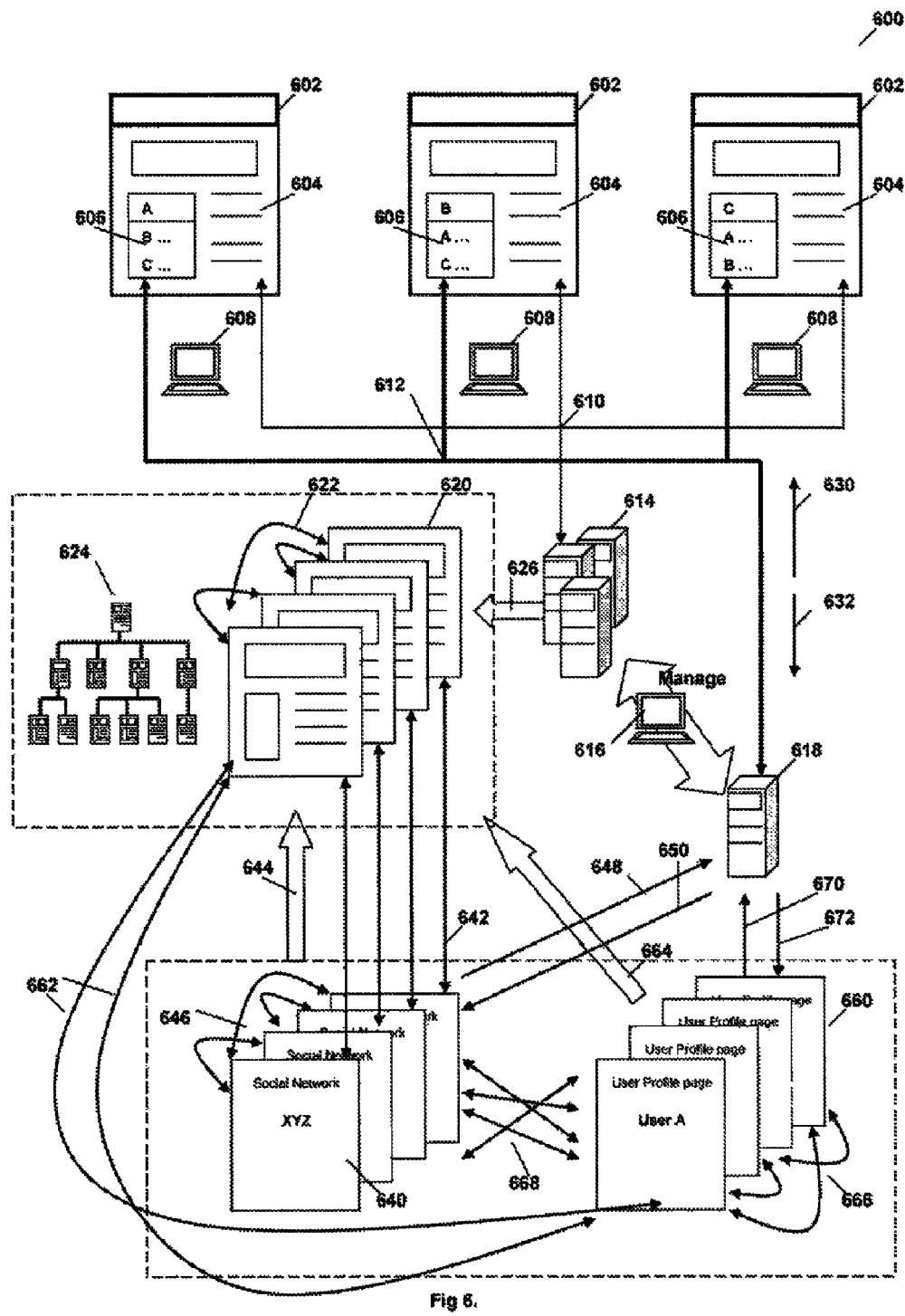
FIG. 6 is a diagrammatic view illustrating an overview of an embodiment of an interactor-enabled system and method in accordance with the invention.

FIG. 6 illustrates an overview of an interactor process and system in accordance with the invention, and shows components that cooperate to afford enhanced content and interactivity.

Browsers 602 represent users who are online. Each browser may request content 604 that is hosted in a given interactor zone on one or more content servers 614. Each content 604 includes the embedded interactor process (script or code) 606, as described above. The interactor processes periodically retrieve data 630 from and update status and related data 632 to the interactor server 618, as illustrated in detail in FIG. 9 and as will be described below. Each user views content 604 from one or more of the content servers 614 via his browser on a screen of a device 608 such as a PC, a PDA, or a mobile phone, or other networked device containing a processor and a memory, and capable of running computer programs.

The content page servers 614 host a hierarchical structure of content pages 620 related to each other as shown at 624, and each page may include hyperlinks 622 to other pages within that hierarchy. These content pages 620 may also contain hyperlinks to content pages that are not hosted by content page servers 614.

A set of one or more social networks 640 each maps and links to a content page 620, as depicted at 642, and a set of interactor network users or members of those social networks, each represented by a corresponding profile page 660 may be linked (668) based on a social network membership list and a friend list of these users. Content pages 620 may also be hyperlinked (662) to the profiles of the users currently being a member of the social networks corresponding to the pages.

The interactor server 618 serves multiple purposes. It receives updates 630 pertaining to relevant user activities, the users' locale and other relevant data from each running interactor process 606. This retrieved information or data is then processed and structured by the interactor server and is available for all running interactor processes to retrieve (630). The data may pertain to all relevant users' activities, data from interactions (such as messages), locale, privacy settings, users' status, users real-time settings, etc., within the given interactor zone.

The interactor network users' profile pages 660 supplement (664) the content pages 620, and the profile pages are stored and hosted at 672 by the interactor server 618. These profile pages are updated based on a user's activities/actions/interaction with others, such as a user's joining to or becoming a member of a social network, and users' chat data, etc., or updated by the profile page owners directly, as by using an update feature of the user profile pages (670). The social network pages supplement (644) the content pages 620 and are stored and hosted (650) by the interactor server 618. The content of each of these social network pages may be updated based on a member users' activities/actions/interactions with other members or interactor network users, or updated directly by a member user or other users through the update features of the social network pages (648).

The augmented pieces of information in user profile pages 660 and social network pages 640 are supplementary information offered to the social network communities as part of the interactor process, together with the original content pages 620 served from the content page servers 614, and provide an infrastructure for a single or a plurality of real-time online social network communities within the interactor network.

A management console 616 that contains a set of user/profile/social networks management applications may be delivered through a GUI that enables an administrative user to manage the interactor server for building the aforementioned relationships 642, 644, 662, 664, 668, 646, 666 between the augmenting data 640, 660 and the original content pages 620.

Interactive User Experience

Figure 4A:
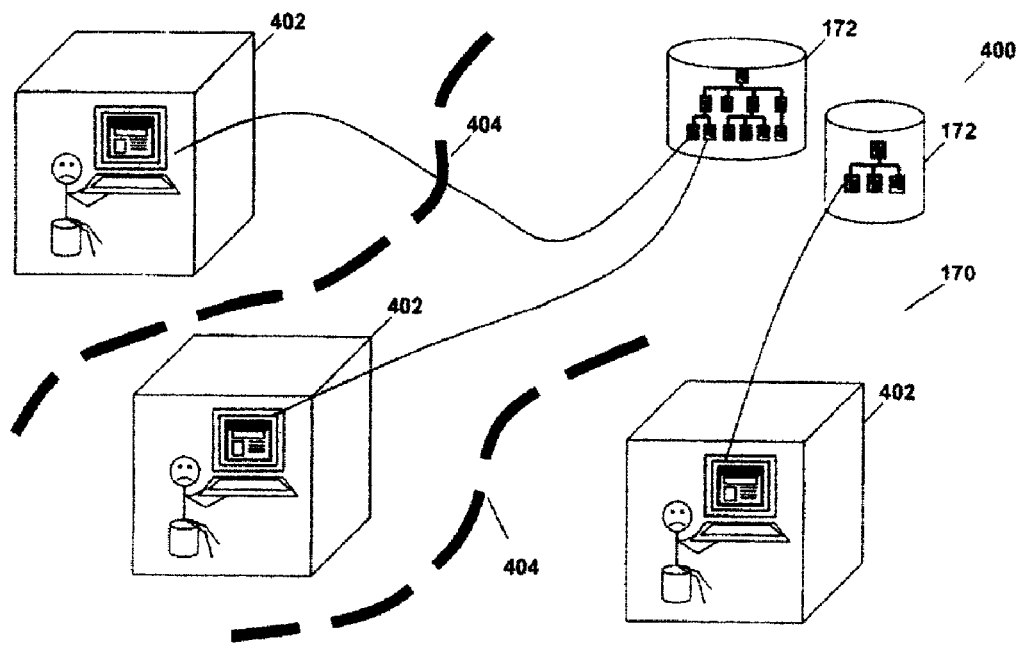
FIGS. 4a-4b, are diagrammatic views showing typical isolated browsing (FIG. 4a) of related pages and interactive browsing (FIG. 4b) enhanced by using embedded interactor software where users can interact in real time with other users in the same interactor zone.
Figure 4B:
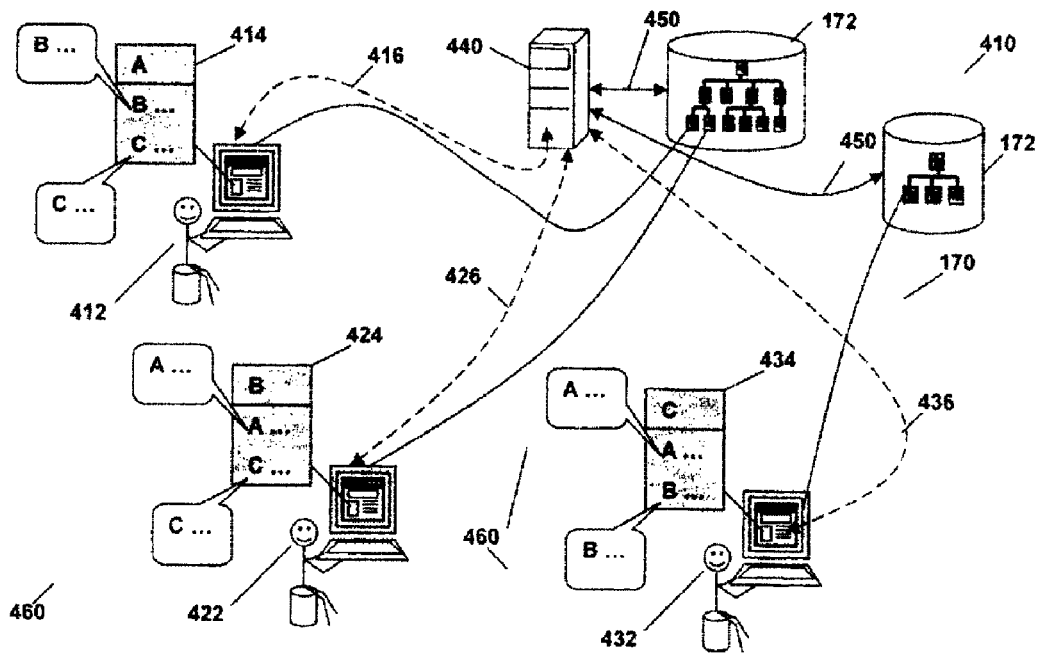

FIG. 4a illustrates the current and typical user browsing experience. We explained that such an experience is an isolated one. FIG. 4b represents a user's browsing experience augmented by the interactor network, with an interactor console acting as an interface to real-time social networks. This enables interacting with other users who are in the same zone.

Figure 7A:
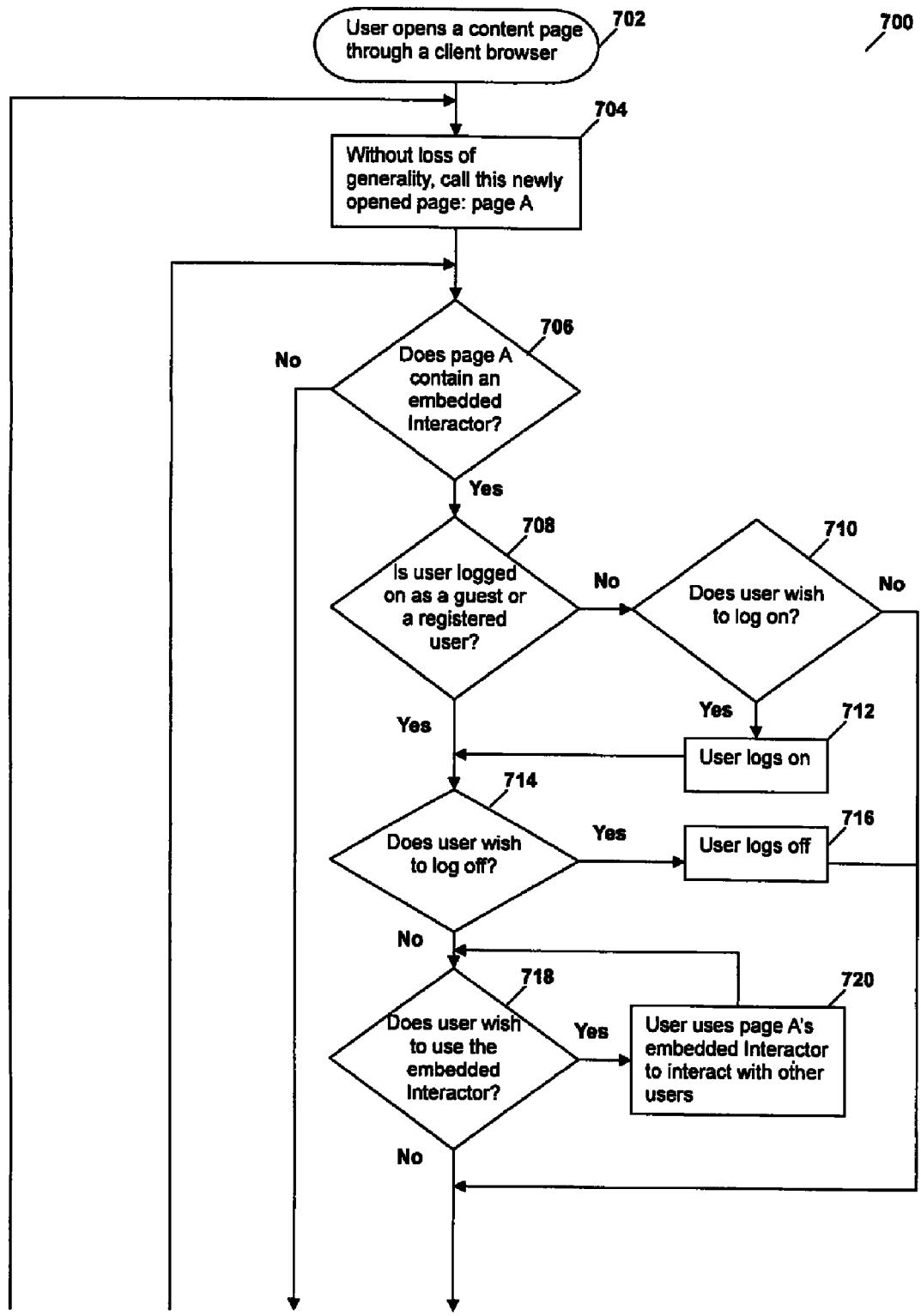
FIG. 7, (FIGS. 7a-7b) comprise a flowchart illustrating a high-level overview of an embodiment of a user-browsing process in accordance with the invention FIG. 8, (FIGS. 8a-8c) comprise a flowchart illustrating an embodiment of a process by which a user interacts with others.
Figure 7B:
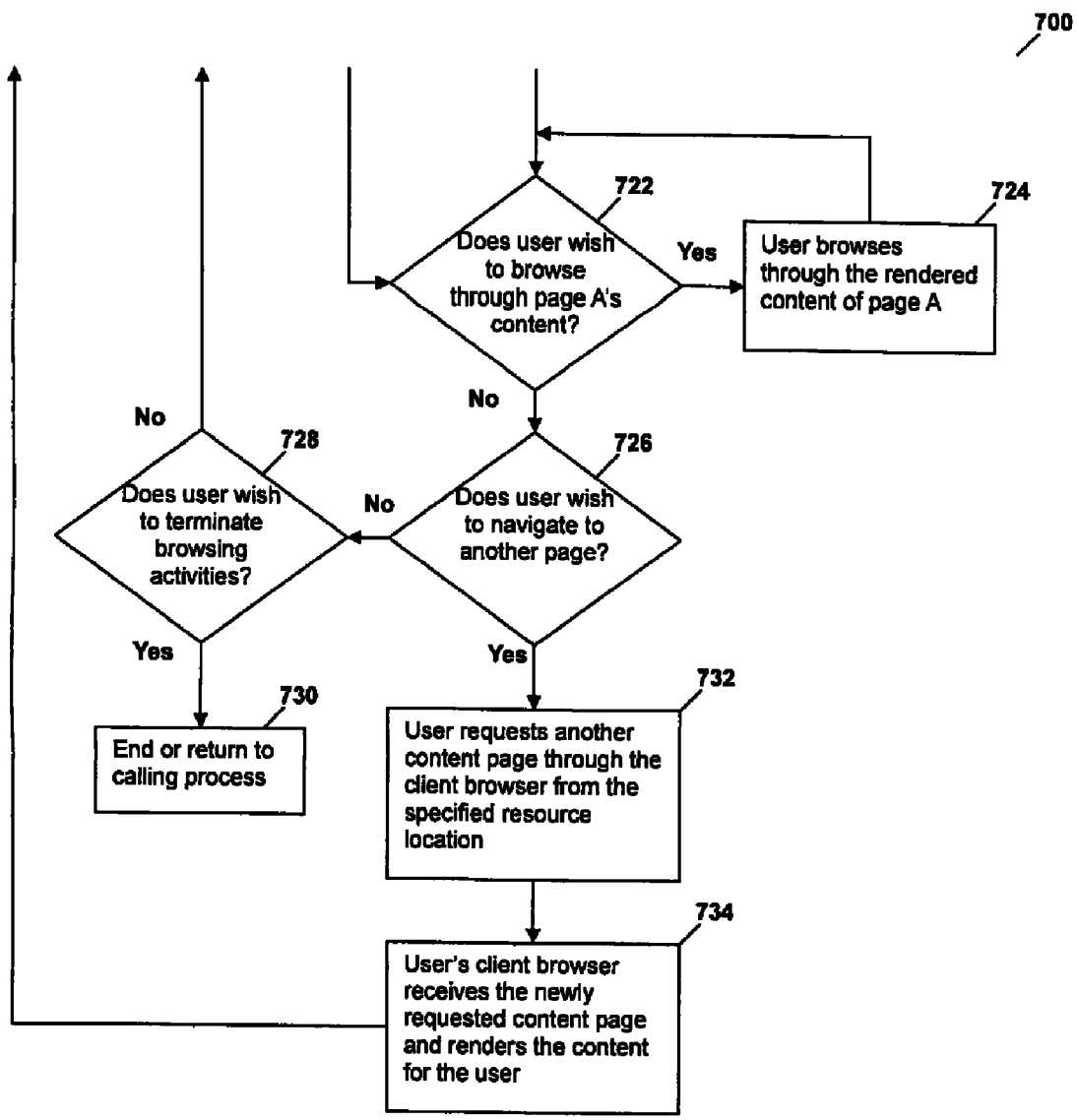

The conventional experience illustrated in FIG. 4a may be likened to walking in a department store with everyone else, including other customers and store employees completely invisible. On the other hand, the experience in FIG. 4b is very similar to the real life experience of walking into a store or a theater and being able to talk and interact with other shoppers or theatergoers. The flow chart 700 of FIG. 7 is a representation of the user browsing experience using the interactor system and method of the invention. That process is described with reference to FIGS. 4 and 7.

A user 412 requests, receives and views a content page on a browser 702. That content page belongs to a given interactor zone and will be referred to (704) as page A. If this page contains an interactor console, the process flow will take the "Yes" decision path at 706. If this page A does not contain an embedded interactor console, the existing (if any) activity data may be maintained as a log as the user browses page A at 722, 724 within the interactor network.

The user at anytime can decide whether to use the enhanced interactive experience. If the user is not logged in (No path at 708) or does not wish to log in as a member or a guest (No path at 710), the user may then either continue browsing page A or another page at 722, 724 without the interactor experience. The following description shall focus on Yes decision paths in processes 706, 708 and eventually 718. In other words, the user is logged in to the interactor embedded in page A. The user may have either a login account or log in as a guest to access the interactor server within an interactor zone set of pages.

At 718, the process flow goes to 720 if the user decides to use the interactor client application that is embedded in page A to interact with other users while browsing page A. Process step 720 will be described in detail in connection with FIG. 8.

In all other cases, if the user either does not use the interactor within page A, or any other content linked or not linked to page A, eventually the user may terminate the browsing experience (Yes decision at 728).

User Interactions Online

Interactor GUI web-based screens on user devices enable a user to find and identify other users of interest, and to interact with them, as for access to information, e-commerce, and learning, among others. The GUI may enable the user to review the profiles of the other members of the social network. As will be described more fully, the interactor client software that is embedded in a content page enables a user to access and interact with other users within the same interactor zone in a virtual real-time environment based upon context determined by predetermined settings, by some social network relationship, or by the virtue of sharing the same interactor zone.

The system and method of the invention offer users the ability in real-time, after signing in using the interactor client software, also referred to herein as the interactor console, to access a set of sliver-interest social networks to contact other members that are online with appropriate privacy levels permitting access, for the purpose of fulfilling a goal such as finding information, content or products to purchase. Guest-member privileges may be granted for a social network zone to others, as may be universally defined and controlled by one or more members. A member may characterize and define access using the profiles of the other members of his social network which may include, for example, among others, statistics on the user's level and quality of interaction as well as a ranking in the social network. Social network members are frequently the best source of real-time information, such as for purchasing a product or finding information or content. Social networks also offer a mechanism for expanding a member's universe and discovering new people.

Figure 19A:
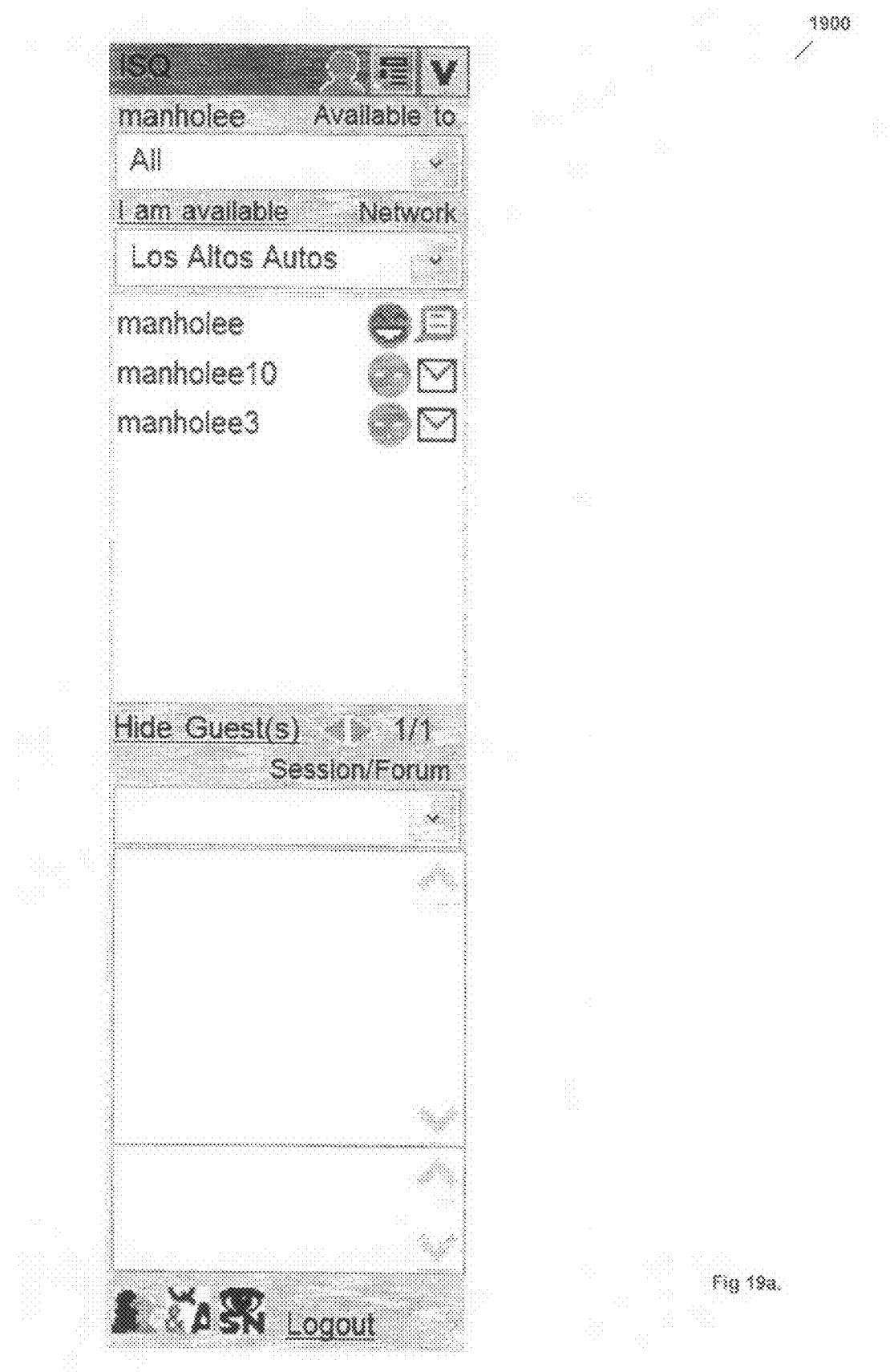
FIG. 19 (FIG. 19a-19b) shows examples of GUIs that may be used with the invention, FIG. 19a showing a locale or page view, and FIG. 19b showing a social network view.
Figure 19B:
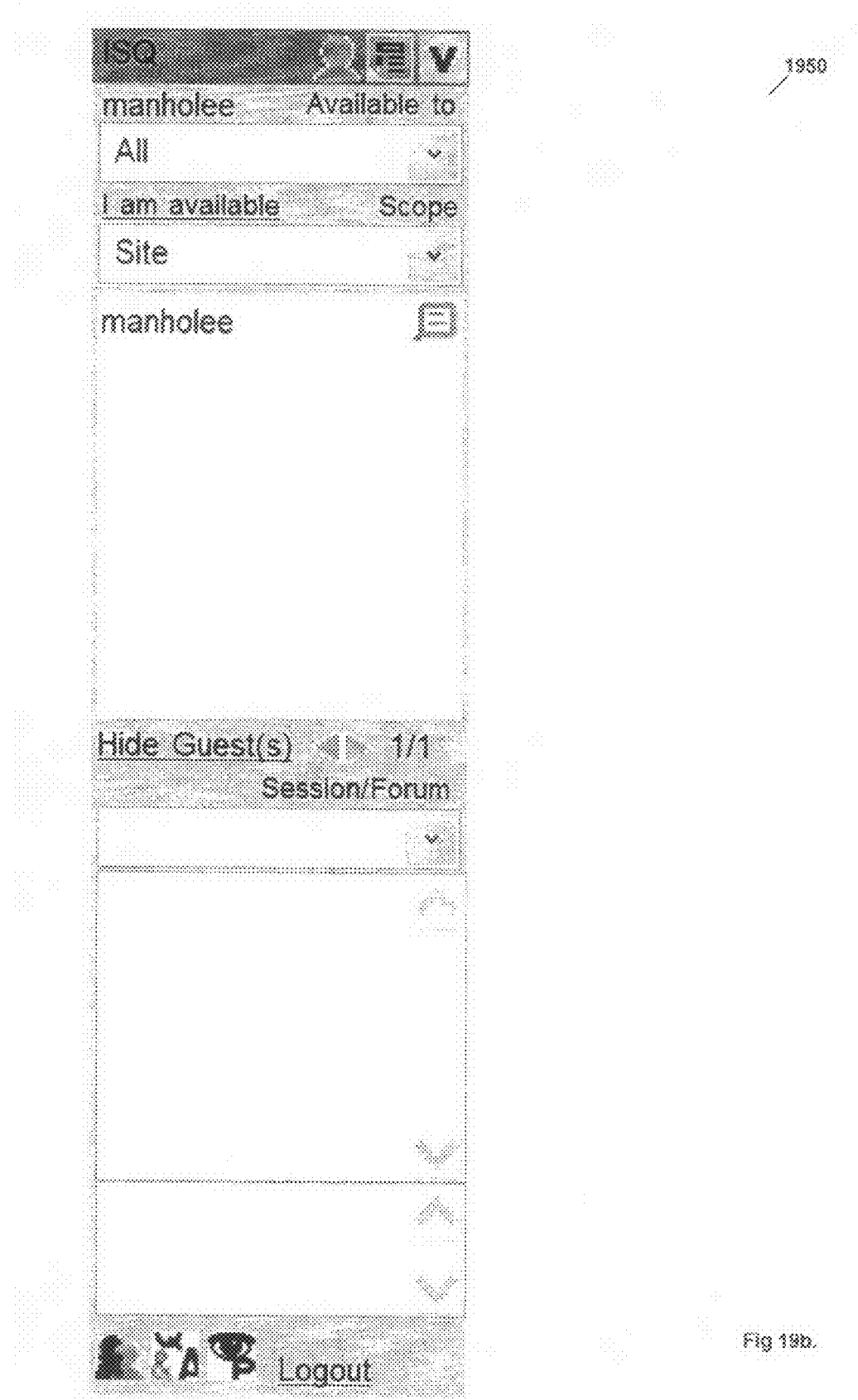

The interactor system may have multiple filters for a user to define criteria for gaining access to other users and their information, and to initiate many possible interactions with them while in the same interactor zone. Examples are a social network filter view (SNV) and an interactor zone filter view, also referred to as a page view (PV). Examples are shown in FIGS. 19a and 19b. The social network view (SNV) allows a user to view the list of other users that he/she can interact with, members or guest-members, based on their social network affiliation, as shown in the social network view of FIG. 19a. The page view (PV) of FIG. 19b allows a user to view the list of other users with which the user may interact, (members or guest-members), based on their locale page, or content they are viewing in the interactor zone. The concept of view and switching between views will be described later in connection with FIG. 8b.

It should be pointed out that the shared interactive experience may be guided by an expert, who may be defined in various ways, based, for example, on membership in one or more relevant social network(s). In that case the expert can navigate and lead interested members in real-time through various content that matches their interests (which could be that of the sliver-interest social network) and help them achieve a goal such as purchasing a product or acquiring knowledge and information. Such action may be performed as a free or paid service, or as an entertainment to such user, or as an act of public welfare to groups of individuals who share the same interests, or as a means to certain end.

Figure 8A:
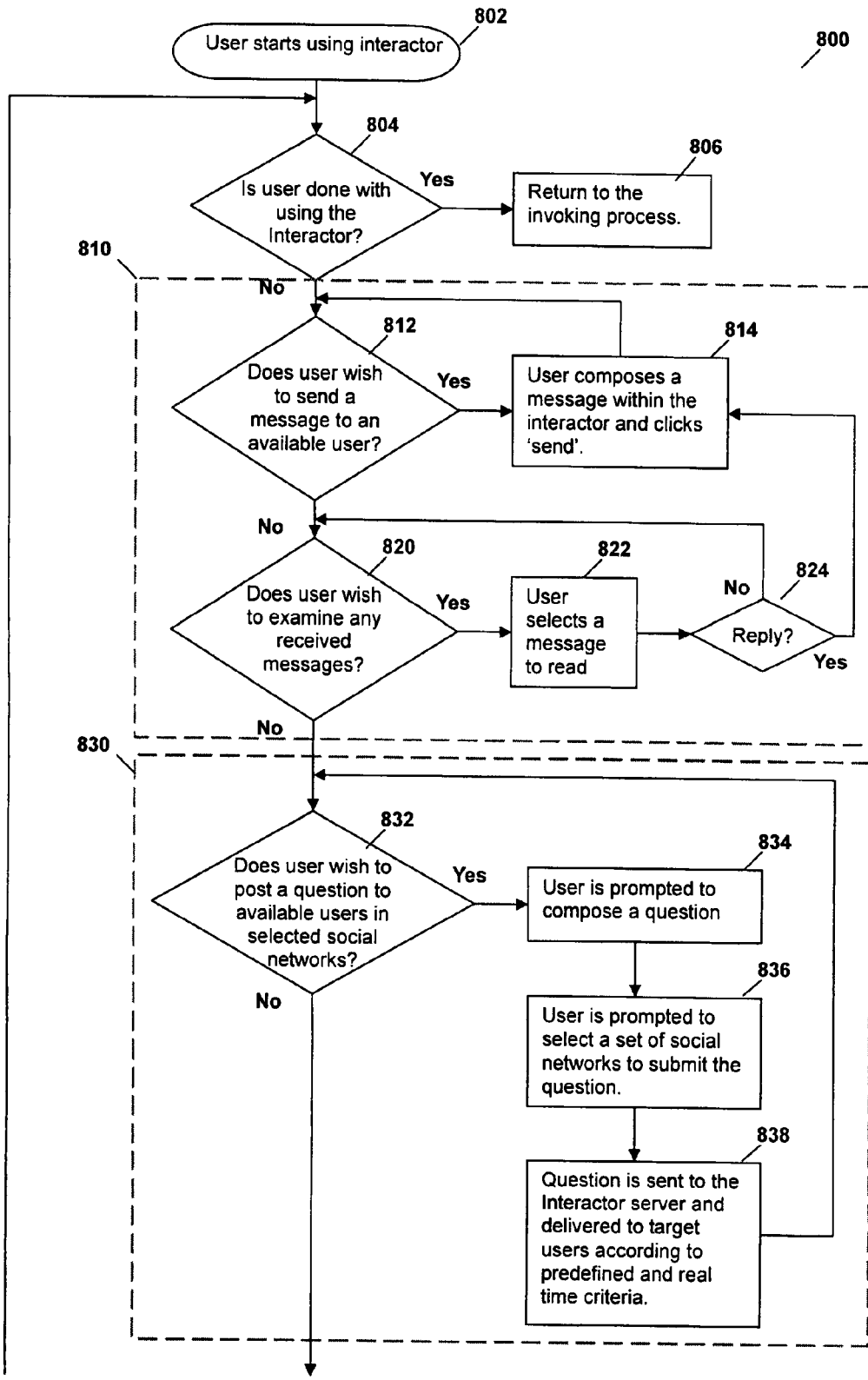
Figure 8B:
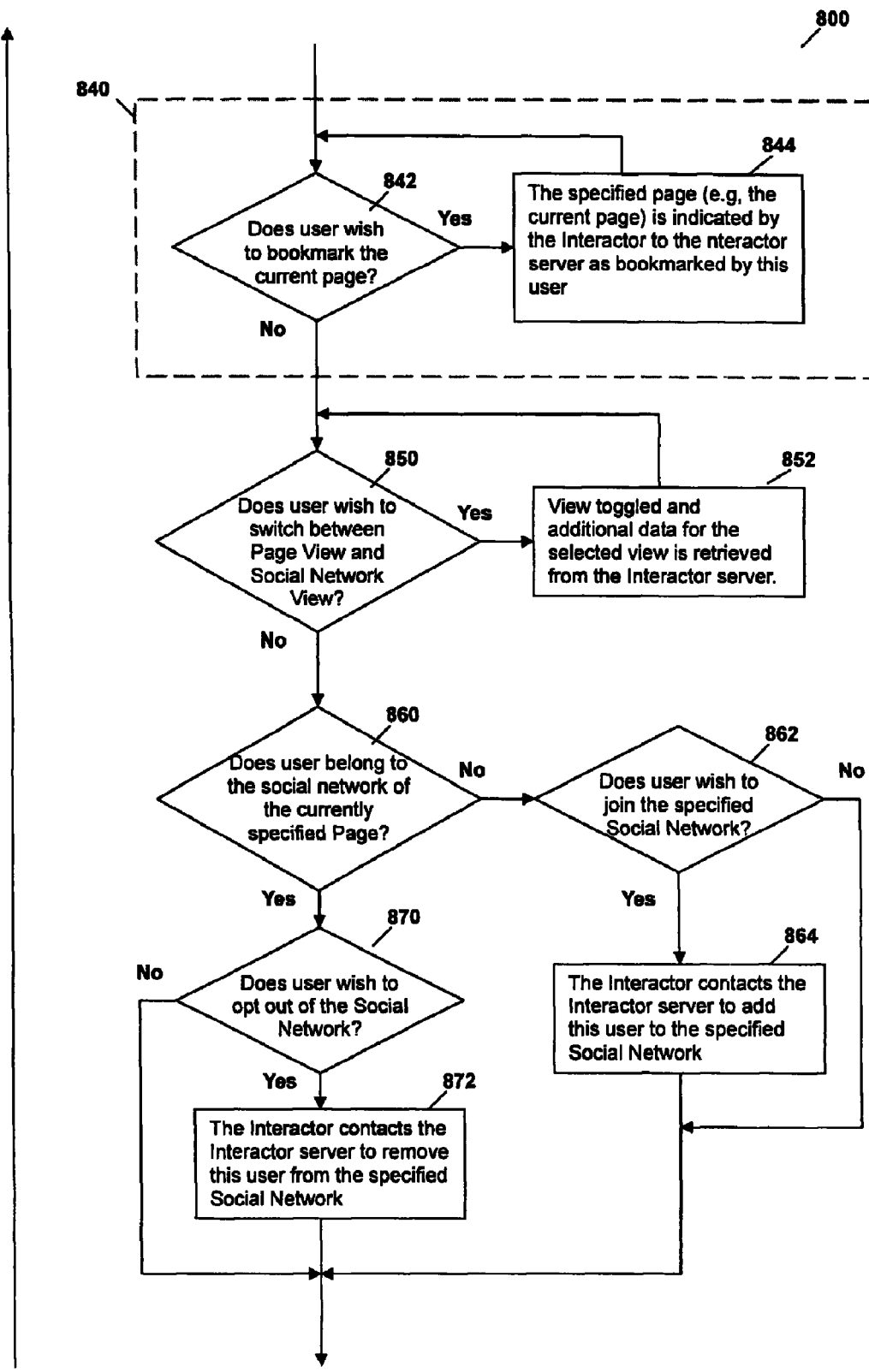
Figure 8C:
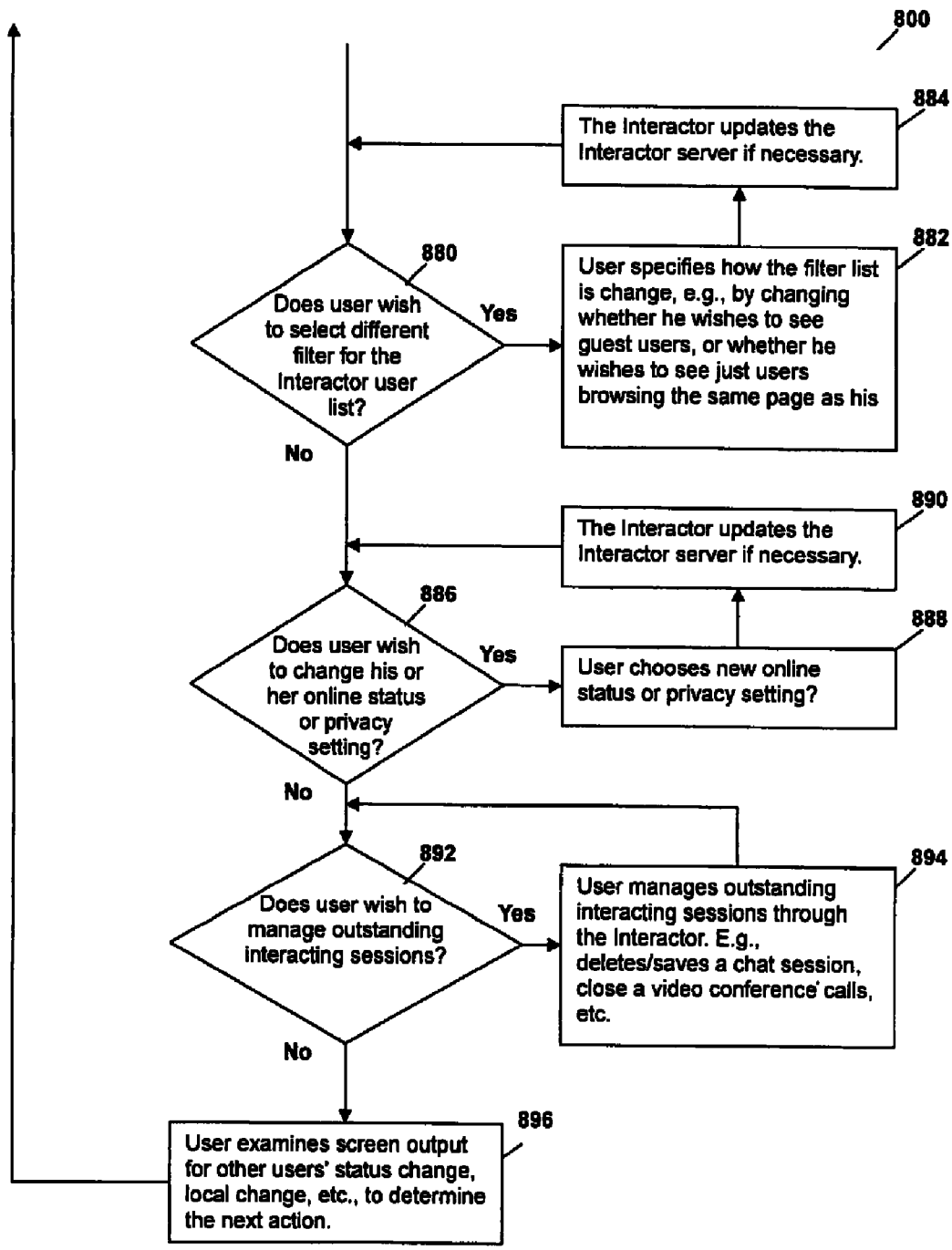

An example of a user interaction process 800 with other users within the same interactor zone is shown in FIG. 8.

The flow chart of FIG. 8 shows an example of activities, performed in a sequential process. This is for ease of describing possible interactions between a user and the interactor system. It will be appreciated, however, that many variations are possible, and that the user has access to the described functionality at anytime while using the interactor system.

Process 810 of FIG. 8*a* illustrates one type of activity a user can engage in with other users through the interactor system. More specifically, process 810 depicts how a user may use text messaging to interact with another online user. User launches the interactor application and continues to use the interactor application at 804. As the user is viewing content that includes the interactor-embedded application, the user may choose to interact with other users, as by sending a message (just one of many ways of interacting), to other user(s) that are part of the interactor zone and that are possibly members in one or many social networks related to that Internet zone. Thus, at 812, the user selects another user with whom he/she wants to communicate, composes a message within an appropriate interactor user interface UI component, and performs the necessary action (such as a mouse click on an action button "send" button at 814) to send the message to the intended user.

If instead, the user does not want to send a message at this given moment, he/she may perform other actions such as reading a message (820, 822) received from other users who are currently online in the same interactor zone and who are members of one or more social networks related to that internet zone. Then, the user utilizing an appropriate UI access to his/her received messages, may read one or more messages, and may reply to any or none of them at 824 and 814. The user could continue to loop within process 810 reading and composing messages, or may quit this activity and perform other types of possible interactions at 830 with other users within the interactor zone.

In process 830, the user may engage with other online users in another possible activity. At 832, the user has the option of posting a question about some subjects or activities to selected ones of the others who may potentially have knowledge of the content of interest. The user, through an appropriate GUI that is part of the interactor client application may compose a question at 834, select a set (one or more) social networks at 836 that relate either directly or indirectly to the subject of the question, or otherwise. The user may select (filter) recipients of the question to those who are members of the selected social networks. That filtering can be based on the preferences of the submitting user as well as the characteristics or profiles of users receiving the question. Such characteristics may include whether they are currently online, how frequently they respond, how active they are within the interactor zone, their level of expertise on a subject matter, and other social networks of which are members, among others. The user's question is transmitted to an interactor server at 838. The interactor server may make available the question for retrieval of the other interactor consoles, as through periodic or on-demand polling by the Interactor console of target users, as may be selected by the user who submitted the question. If the user does not wish to ask further questions at this time, the user may proceed with another activity, as at 840.

At 842, the user has the option of yet another activity, though not an interactive one. The user may wish, for example, to augment his/her profile with a reference to the content he/she is currently viewing. A message may be sent to the interactor server with a request to bookmark, at 844, particular content for that user. The user might also navigate within the interactor zone and bookmark additional content or move on to another activity.

At 850, the user has the option at anytime to switch from a page view (PV) to a social network view (SNV). Each view has a particular advantage and serves a particular purpose. For instance, if the user wants to focus on others that he has a social network relationship with, he/she may use the SNV. The interactor process may show a structured list of other users within the social networks that the user is interested in. If the user wants to focus on interacting with users based on the content they are currently viewing in the interactor zone, the user would use the PV.

At 860, a user is not already a member of a social network linked to the currently viewed content or page. The user has the option at 870 of opting out of the membership, or joining. In either case the interactor client sends a request at 872 to the interactor server 864 or 872 to perform the appropriate action and update the user information accordingly.

At 880 a user can further filter the list of users that he/she would like to interact with, within the PV or SNV. The user may wish to only view the list of users that are accessing the same content as he/she or maybe the list of users that belong to a specified set of sliver-interest social networks. These filters can be mixed and matched. For example, while in the SNV the user can filter by locale of others, i.e., what content they are viewing. In addition, while in the PV the user can further filter the list of users that he can interact with by social network affiliation/membership. The filter information may be sent to the interactor server at 884, which in turn updates the user's visible online user list.

At 886 a user may change she/he privacy settings or online status at 888. That change is transmitted to the interactor server to appropriately update at 890 the user information and propagate this change to all users within the interactor zone that are online and have some relationship or access to that user via their interactor processes. Examples of changes are the user online status can include, but are not limited to, "away", "busy", "invisible", etc. User privacy changes can include, but are not limited to, restricting who, i.e., others within the interactor zone or social networks members linked to the user, can have access to the user from their interactor processes. An example of the latter in an e-commerce site may be to only allow users that belong to social networks linked to brands A, B and C and that have bought any of those brands' products within the last two weeks to see the user.

At 892, the user may manage outstanding interacting sessions using the interactor client console. These are primarily to save, delete, close any open windows through which he/she interacted with others in his/her current session that are or were in the interactor zone. The user may choose to save any interaction, for example, such as a chat with another user, etc.

Figure 9:
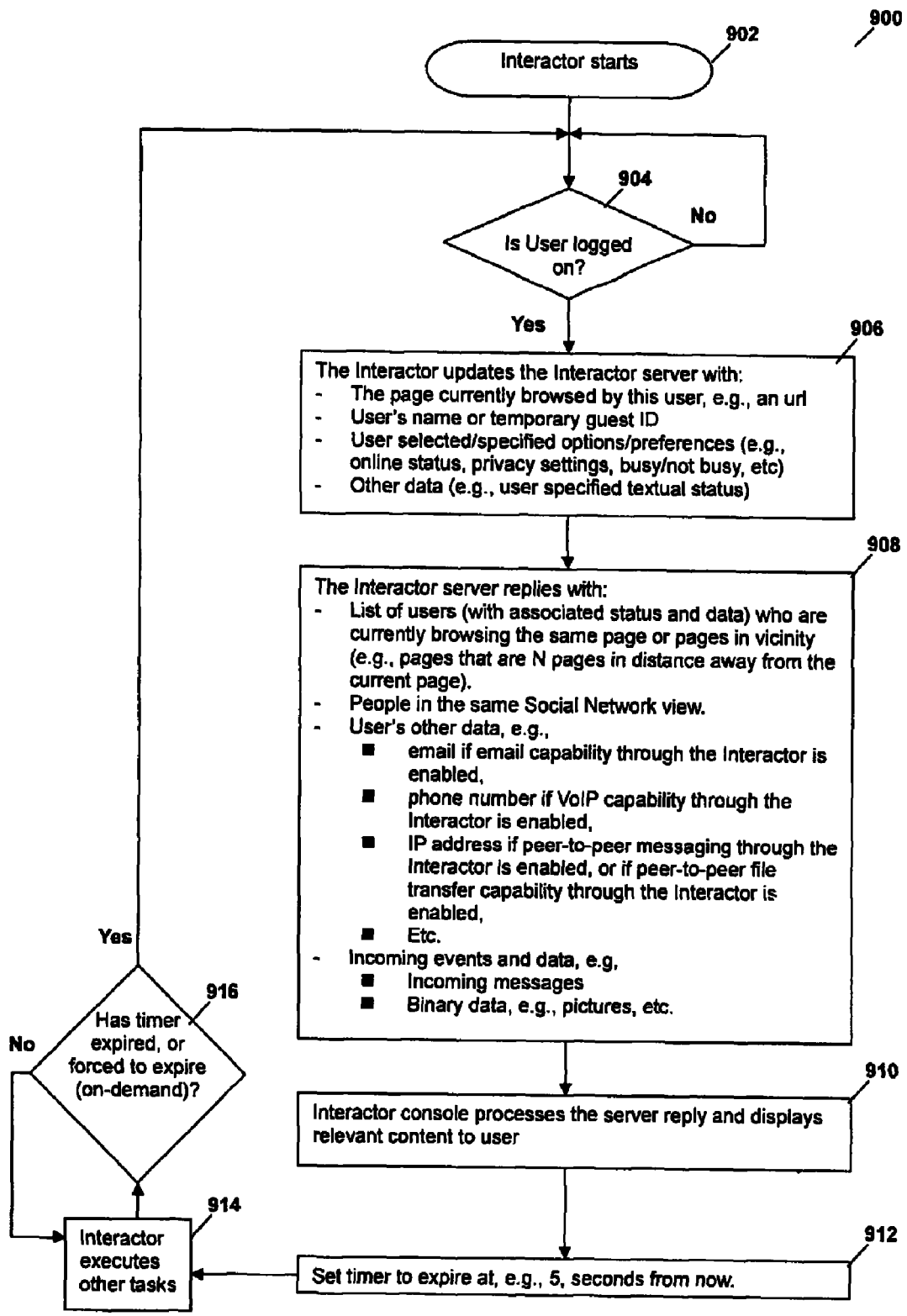
FIG. 9 is a flowchart of an embodiment of a process illustrating how an interactor client application (console) periodically/on-demand updates and retrieves data from the interactor servers.

For the interactor process to function as described, a mechanism for communication between any interactor client application (console) within the interactor zone and the interactor server(s) for that zone is required. FIG. 9 illustrates an example of that communication.

Updating and Retrieving Data from an Interactor Server

Referring to FIG. 9, the general approach is as follows. A user accesses some content at 904 and is logged in to the interactor process 900 as a user or guest. The interactor client for that user may send information/data on the user to the interactor server at 906. Such data may include, but is not limited to, currently viewed content information (URL) and any privacy/online status options selected by the user.

The interactor server may respond at 908 to the request submitted by the interactor client with the appropriate information/data. Such data may include, but is not limited to a list of users that are currently in the interactor zone based on their locale (the page they are viewing) and to whom the user has access based on their privacy levels/online status settings (if SNV is used then this information may include social networks affiliation versus locale), access to appropriate interaction applications, any incoming messages or questions to the user from others, etc. At 910 the interactor console updates the user's displayed data accordingly. Since users can navigate content in an interactor zone at any time, the foregoing processes 904-912 may be repeated constantly.

The process cycle herein is referred to as the interactor refresh cycle. The interactor system can be updated by at least two methods, either on demand by the user or by a logical necessity as a consequence of certain user actions or operations, or through a timer setting at 912 in the interactor server. The refresh process may be repeated based on the expiration of a timer at a pre-selected time interval, say every five seconds. During these steps, other functions and features are preferably available at 914 to the user between and during refresh cycles.

Figure 10:
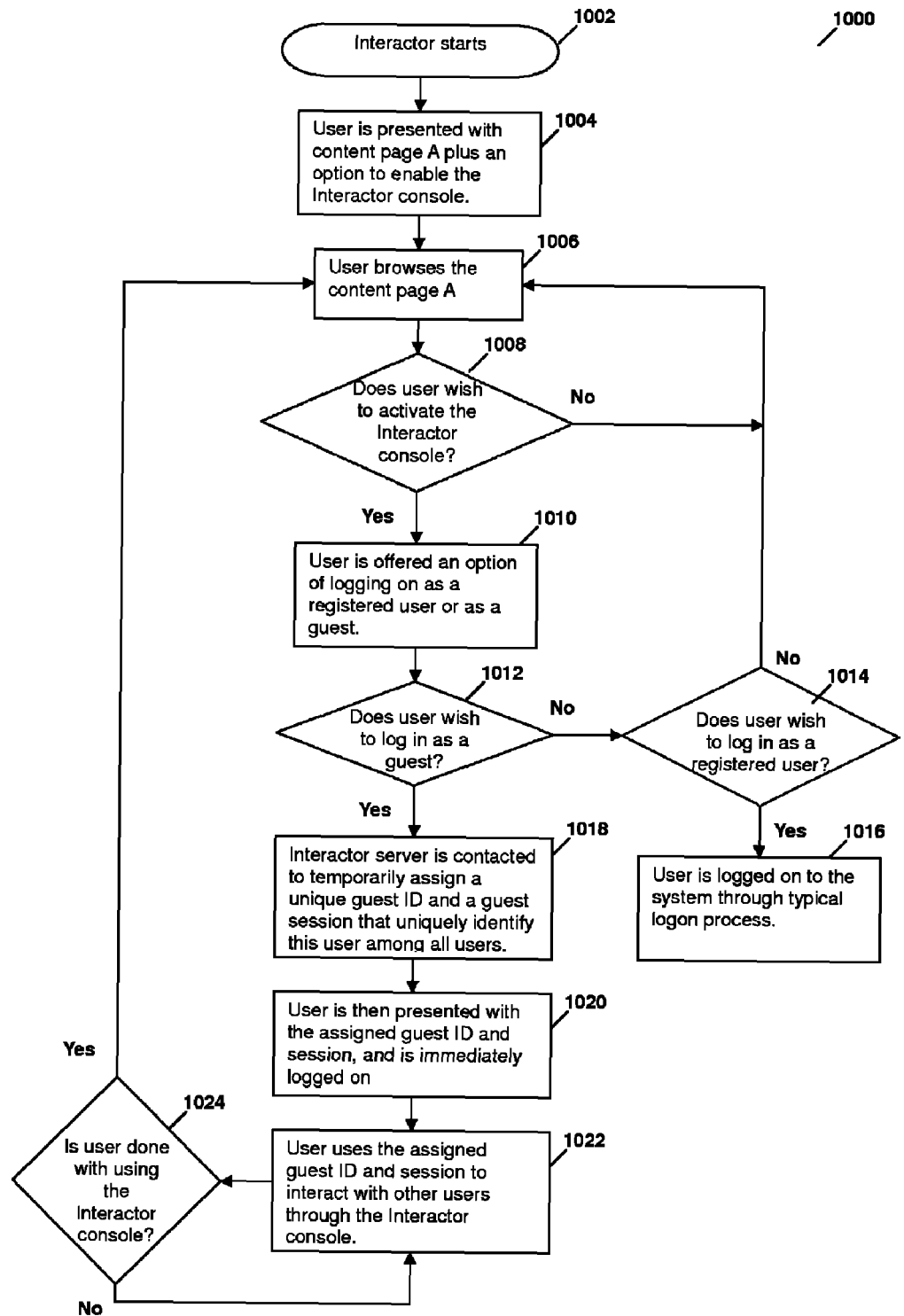
FIG. 10 is a flowchart of an embodiment of a process by which a non-registered guest is granted access to use the system of the invention.

A unique feature of the interactor process and interactor server of the invention is that it allows guest users to interact with others that are in the interactor zone. The level of such interaction may be determined by the interactor server setting. FIG. 10 describes an example of one mechanism 1000 for a guest user to use the interactor process and to interact with others.

At 1002, a guest to the interactor zone is viewing some content within that zone with the interactor client embedded in the content. First, the guest is presented at 1004 with an option to enable the interactor client while viewing a page content at 1006. The user may enable the interactor console at 1008. He may be presented at 1010 with an option to register or login as a guest. The user decides to logon as a guest at 1012, the interactor server is notified by the interactor process that there is a guest login request by the user. The server assigns at 1018 a temporary identifier (ID) and a guest session identifier (SID). The ID and SID uniquely identify the guest during the guest's session in the interactor zone. The guest receives his/her ID, which is displayed in the appropriate GUI of the interactor console at 1020 that is part of the content he/she is viewing. The guest may be immediately logged on, and may now interact with other users at 1022 as a registered member by using the ID and SID. The interactor server settings can restrict what the guest may do or what GUI they may access.

The user can continue using the interactor or can log off at 1024. Alternatively the user can decide to become a registered member at 1016. In this event, the interaction content can be stored on the interactor server using the ID and SID. The session data may be stored for a specific duration that can be set by the interactor server. If the guest returns within that set time duration and re-logs on as a guest, he/she may have access to the stored history. Otherwise, it is deleted.

Figure 11:
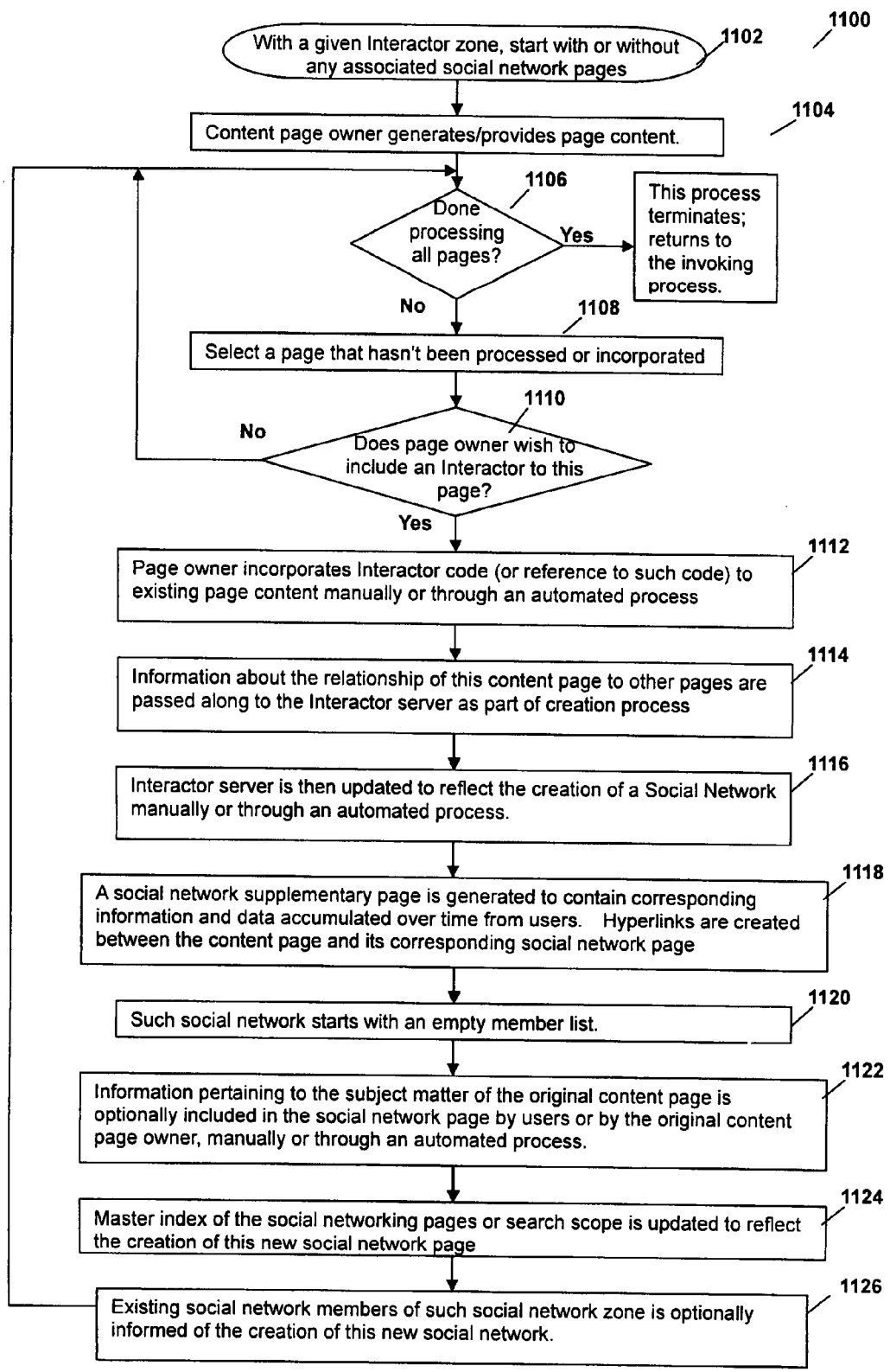
FIG. 11 is a flowchart of an embodiment of a process by which a content page owner may incorporate interactor console software into a collection of pages and create corresponding social networks.

As described above, the invention creates social networks or sliver-interest social networks linked to a content page. FIG. 11 is a flow chart of a process 1100 for incorporating the interactor console in a collection of interactor zone pages and enabling social networks linked to each page, and shows how a content owner may setup a page or pages within the interactor zone and enable social networks linked to a page in that zone.

At 1104-1110 a content owner selects the pages in which he/she would like to embed interactor code, and then sequences through the following procedure for each page. For each page, the owner may drop at 1112 the interactor code, or a reference to the interactor code, into the page. This code "drop" can be performed manually or automated. At 1114, information on other content pages that are linked to this page within the zone may be sent to the interactor server.

At 1116, the interactor server invokes a process to enable a social network, say social network A, linked to that page, say page A, to create at 1118 a social network home page (SNHP). This SNHP may host information on and links to the appropriate content that links to social network A. The inclusion of initial content in the SNHP can be done manually by the owner of page A, or automatically. In addition, hyperlinks may be created to link the appropriate content pages to the SNHP of social network A.

Initially, at 1120 social network A has no members. However, through an interactor server setting social network A may inherit members from other social networks that are associated with content that is a parent or related to the content to page A. The SNHP may be updated at 1122 manually, on an ongoing basis by the social network members or by the page A owner, or in automated fashion with content related to page A and social network A member interactions. This process will be described in detail below in connection with FIG. 12.

Social networks need to be identified, accessed and searched by users. The interactor server may maintain and update at 1124 a master index of social networks (MISN) with social network A information, such as name, related content name, etc. Existing social network members in the same interactor zone may be notified appropriately at 1126 of the creation of social network A.

The owner may repeat the foregoing process until all pages that are selected to be interactor-enabled have been interactor enabled and have an affiliated social network.

Figure 12A:
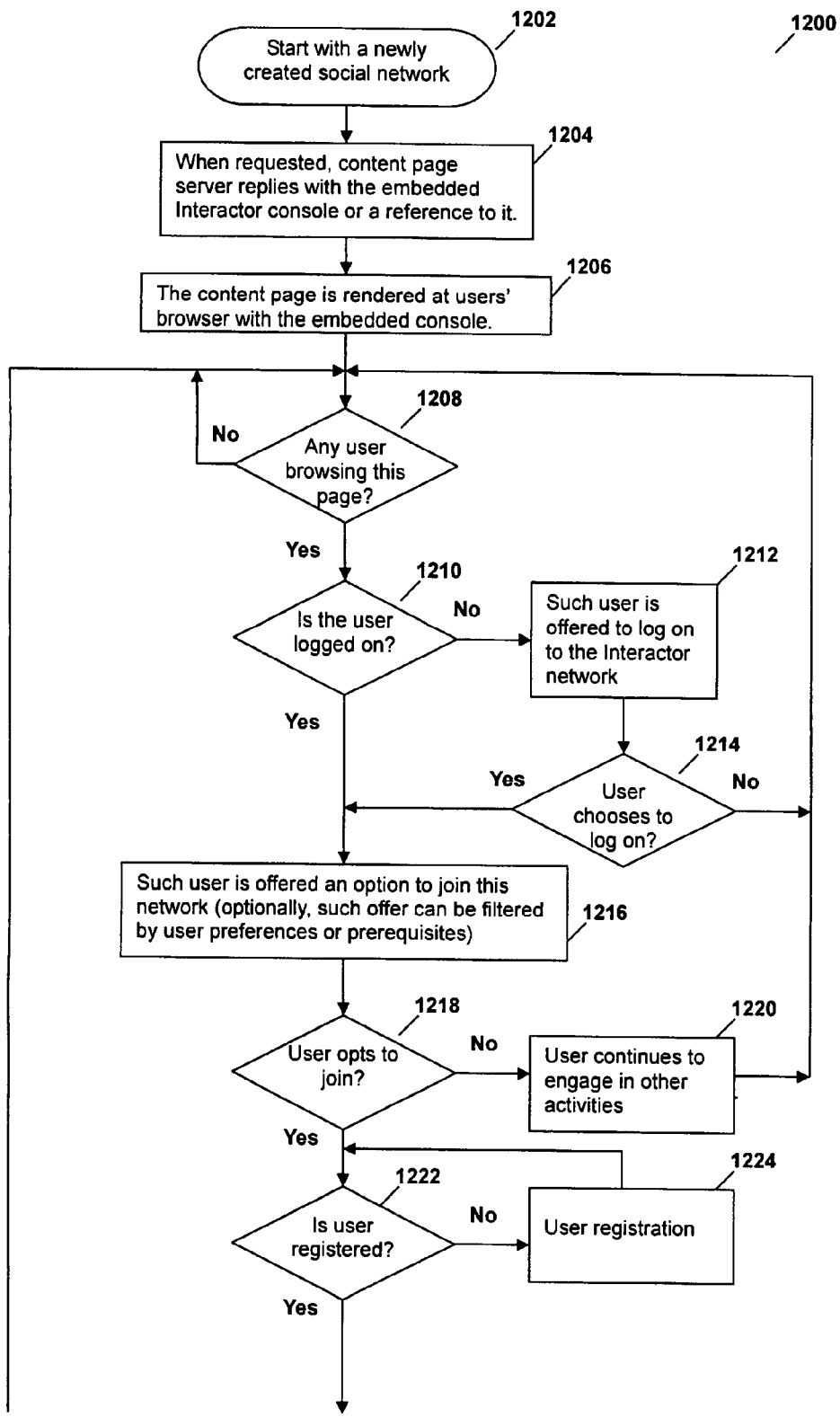
FIG. 12 (FIGS. 12a-12c) comprise a flowchart of a preferred embodiment of a process by which the content of a social network page may be augmented and supplemented.
Figure 12B:
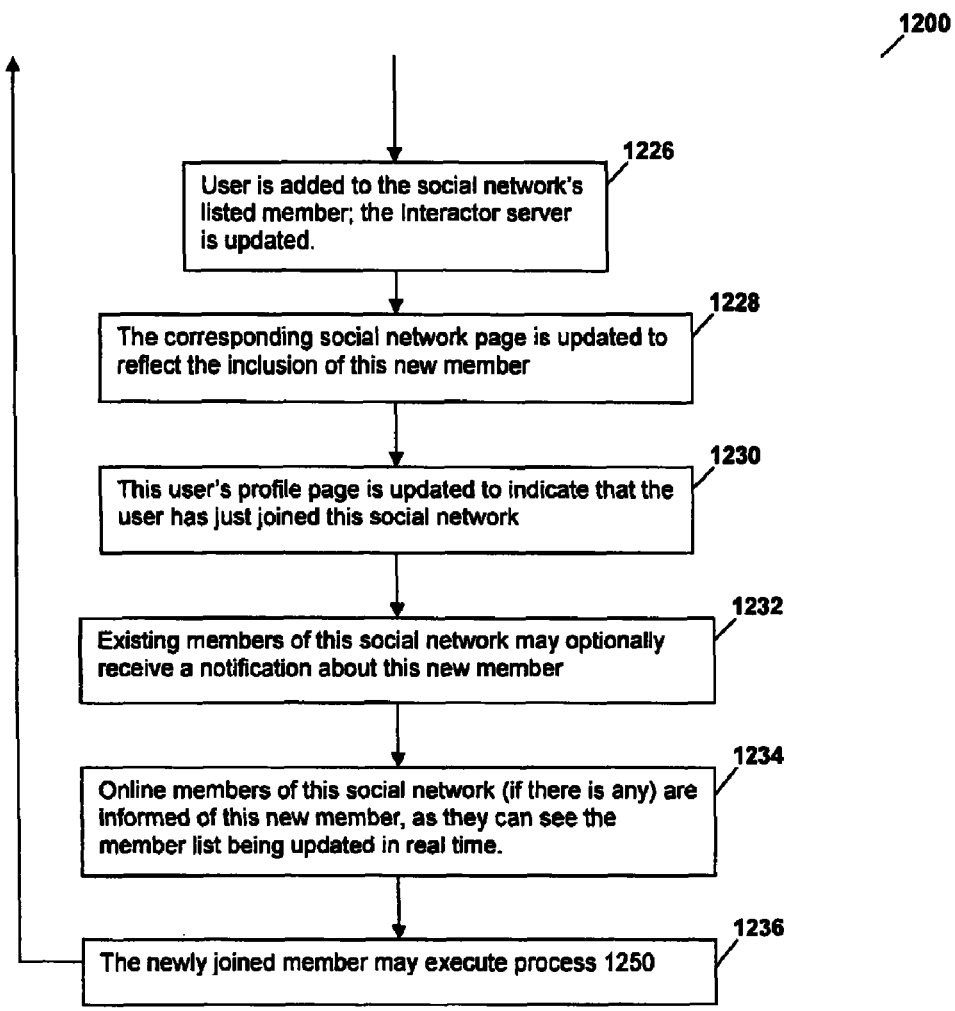

As indicated above, a newly created social network affiliated with a content page gets its own SNHP. Furthermore, content can be added to the SNHP either manually or in an automated fashion, and update can be done by the content owner or by the members of the social network. The flow chart of FIG. 12 (process 1200) illustrates a method for augmenting and updating a social network home page (SNHP). FIG. 12a and FIG. 12b describe the automated augmentation of SNHP with a new member data, and FIG. 12c describes how a member can update the SNHP, as well as the updates needed when a member opts out of membership.

FIG. 12a shows at 1202 how a member requests a page from an interactor zone which is served to the user at 1204-1206 by the interactor server, either with the interactor code (or a reference to the code) embedded in the page content.

The process of the flowchart is self-explanatory, and this description will focus on the part that accomplishes the augmentation of the SNHP with the user information. If the user is logged in as a guest, he/she will have to register to join the social network. An invitation to join can be given when the user is associated with the viewed content. That invitation may be filtered at 1216 by one or more users privacy settings. In other words, the user might only want to be invited to join networks that have some of his friends as members, or that is related to some specific type of content. The ability to join a social network with a single click is described later in connection with FIG. 15.

At 1226 (FIG. 12b), once the user accepts the invitation by registering, the interactor server will be updated accordingly. The SNHP is updated at 1228 with the new member's name and a link to his/her profile.

The user profile may also be updated at 1230 with membership information. Steps 1228 and 1230 may occur simultaneously at the interactor server. The social network members might (based on their privacy and preferences) be notified at 1232 about the new member or not. In addition, online members that are currently accessing content from this interactor zone may be informed at 1234 of the new member through an update of their list of users. The new member (as well as any existing member) may now include additional updates at 1250, as will be described next.

Member Update of an SNHP

Figure 12C:
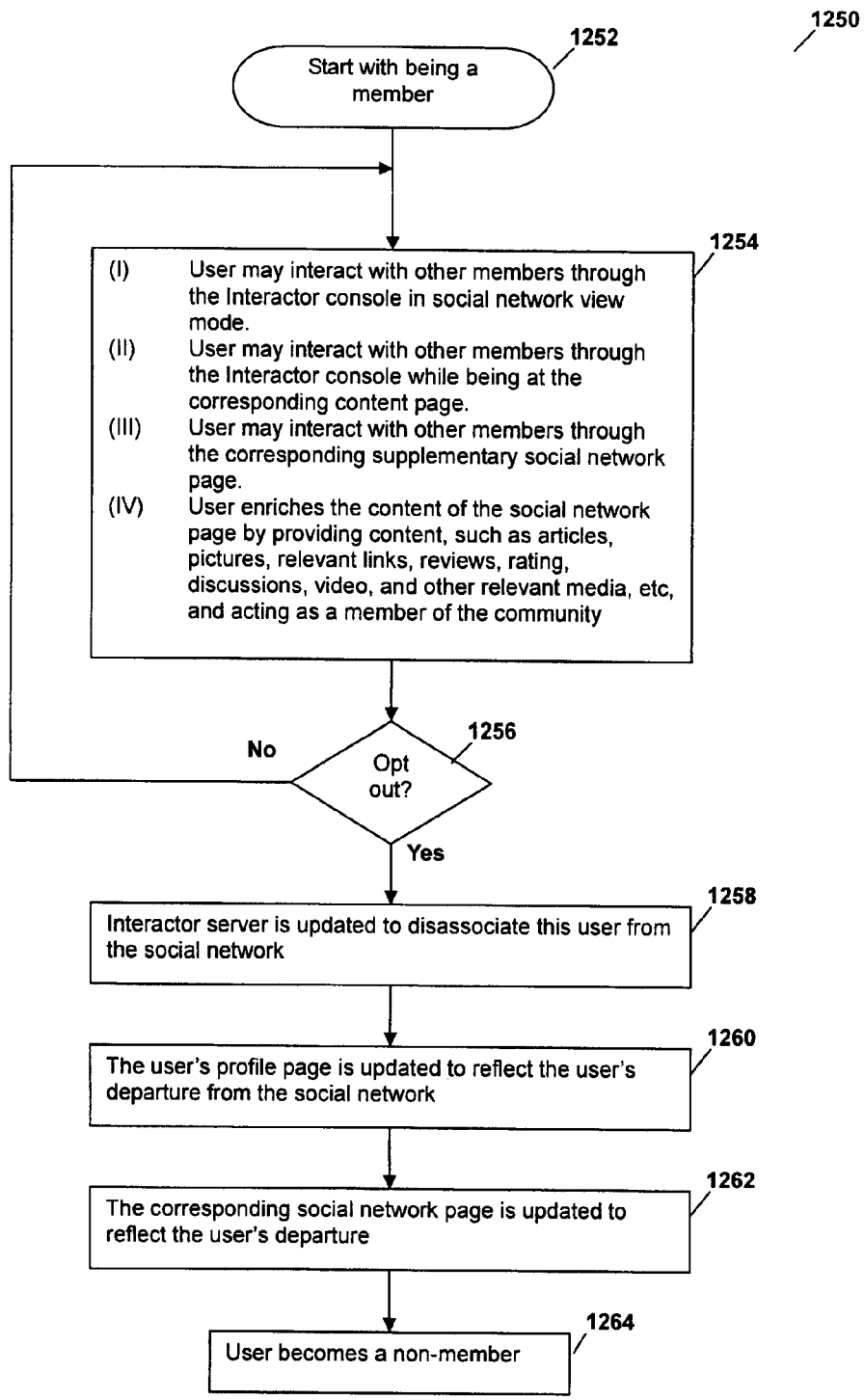

A member of a social network with a SNHP generates content while interacting with others in various ways, some of which are indicated at 1254 of FIG. 12c. An example would be a chat with another member using the console GU, or accessing an article pertaining to the content (sliver-interest) with which the social network is associated. The user can add that generated content (or a reference to it) to the SNHP. This enriches the social network experience for others and builds up a knowledge base on the sliver-interest. This is much like what Wikipedia does, for example, for words or concepts.

At anytime a user may opt out of a membership at 1256, in which case his/her information will be deleted from the SNHP at 1258 and the user profile at 1260. The remaining members of the social network may be notified of this change. The coordination of data removal from the SNHP and online user lists may be done by the interactor server. The ability to opt out of a social network with a single click is described later in FIG. 15.

Locale Based Interaction

A significant advantage of the invention is the ability for users to view (or to have access to a reference to) what other users that are in the same interactor zone are viewing (privacy permitting), and to be able to interact with them using the interactor applications and GUI. An example is the ability to shop together or to view a video together online, and basically, to be aware of what another user is accessing in the same interactor zone. This process 1300 is described below and shown in FIG. 13.

Figure 1A:
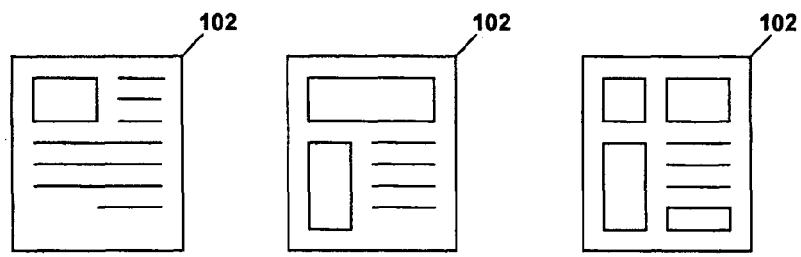
FIGS. 1a-1g, is a set of diagrammatic views of various structures for content, FIG. 1a showing scattered and unrelated content pages.
Figure 1B:
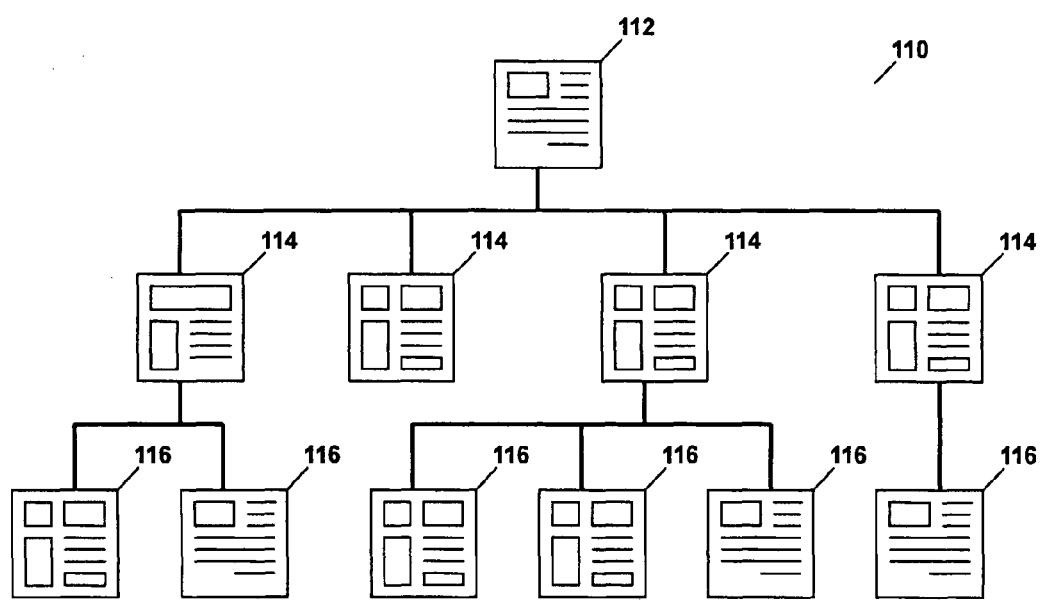
Figure 1C:
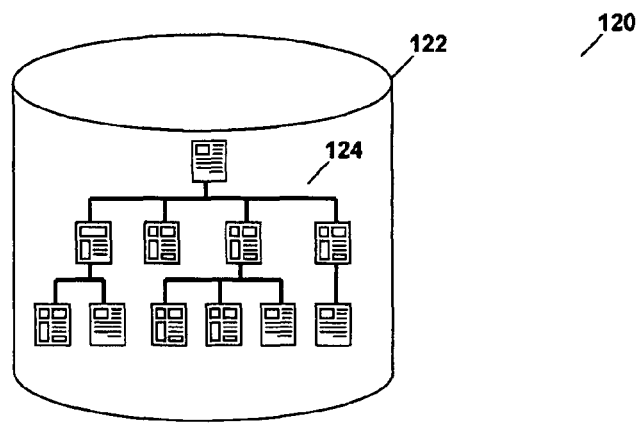
Figure 1D:
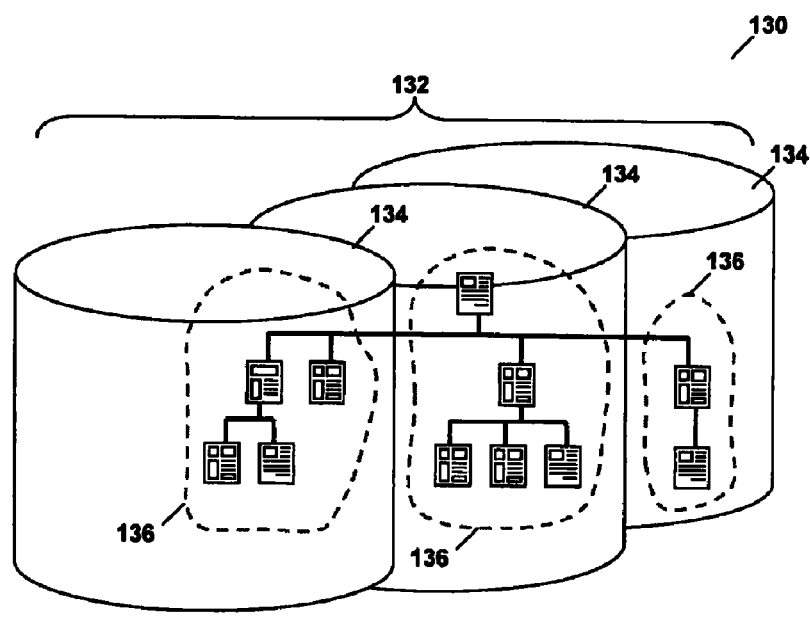
Figure 1E:
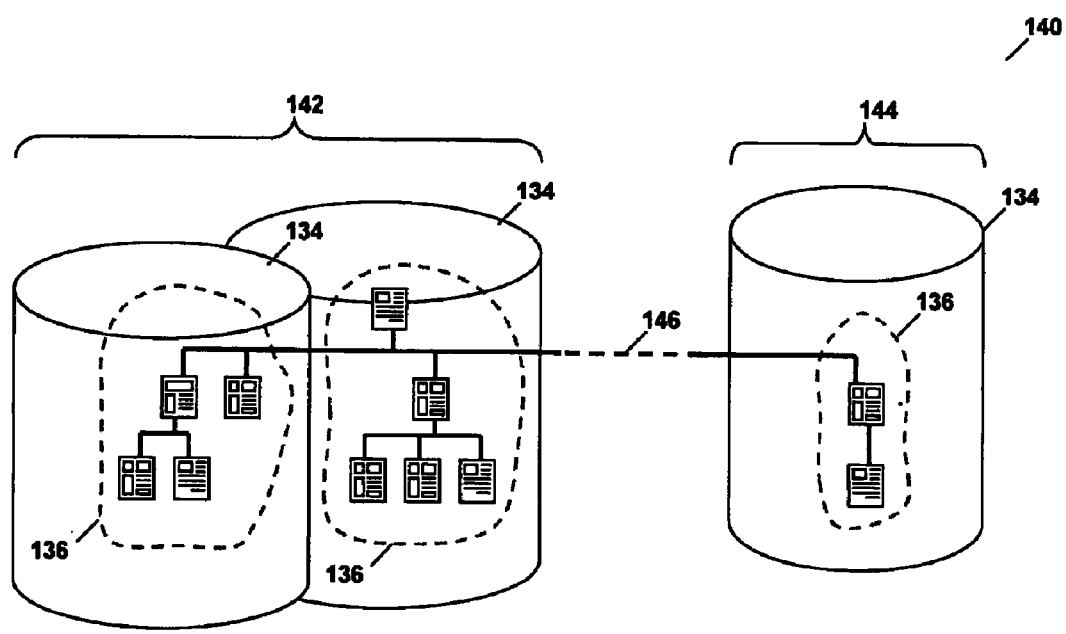
Figure 1F:
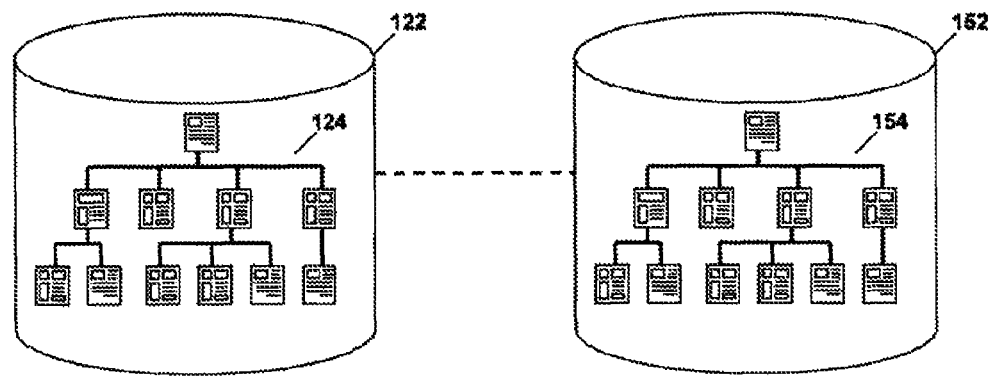
Figure 1G:
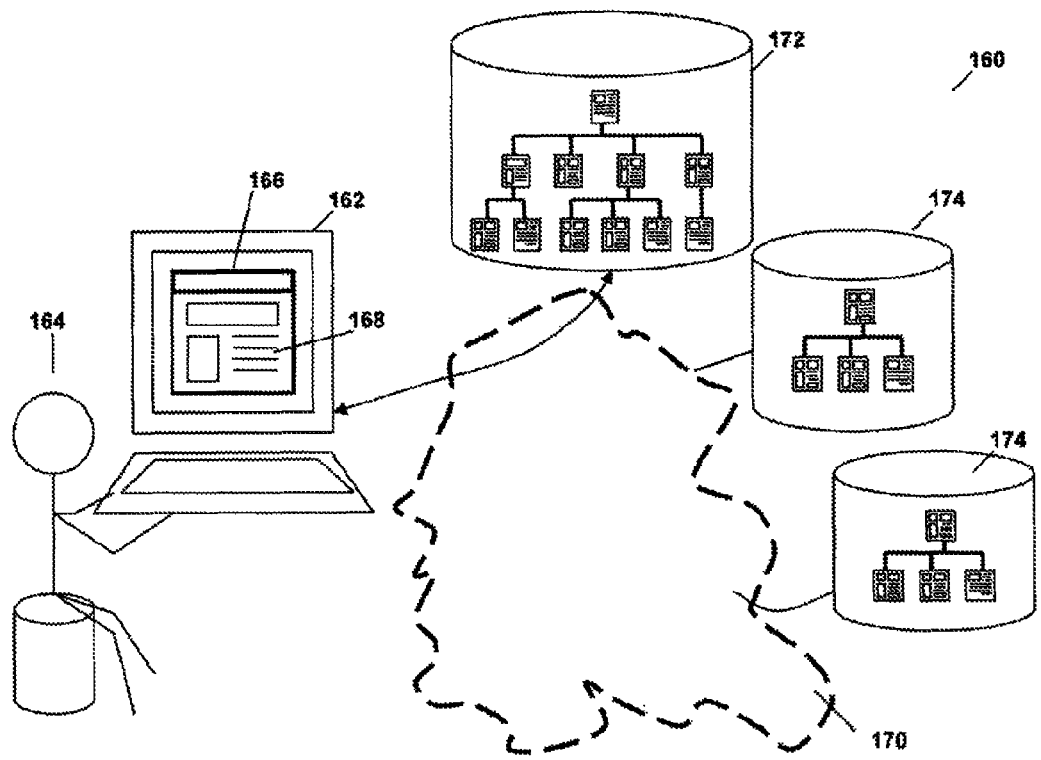
Figure 2A:
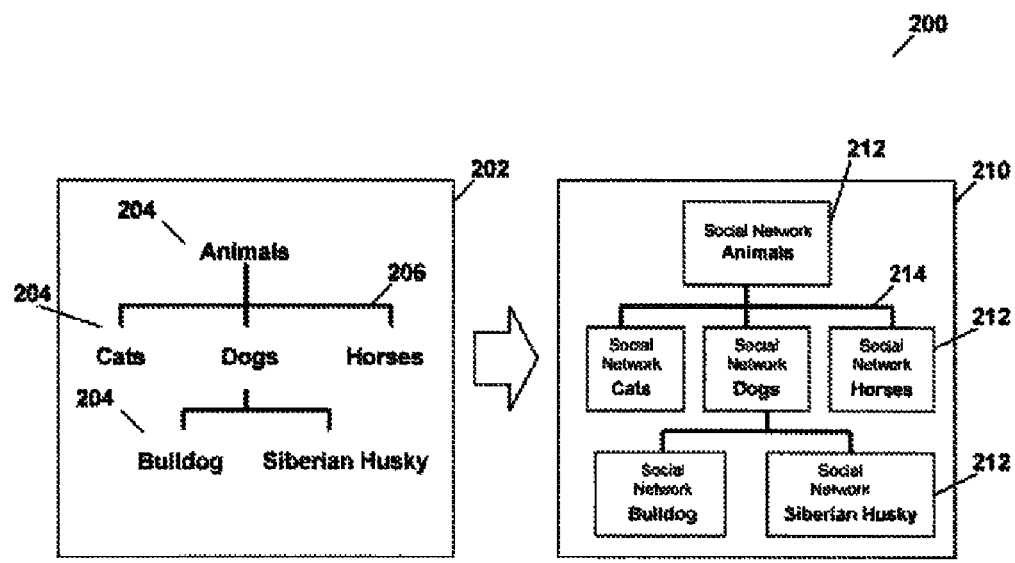
FIGS. 2a-2c, are diagrammatic views illustrating various structured social networks, FIG. 2a showing a social network mirroring a real life object hierarchy.
Figure 2B:
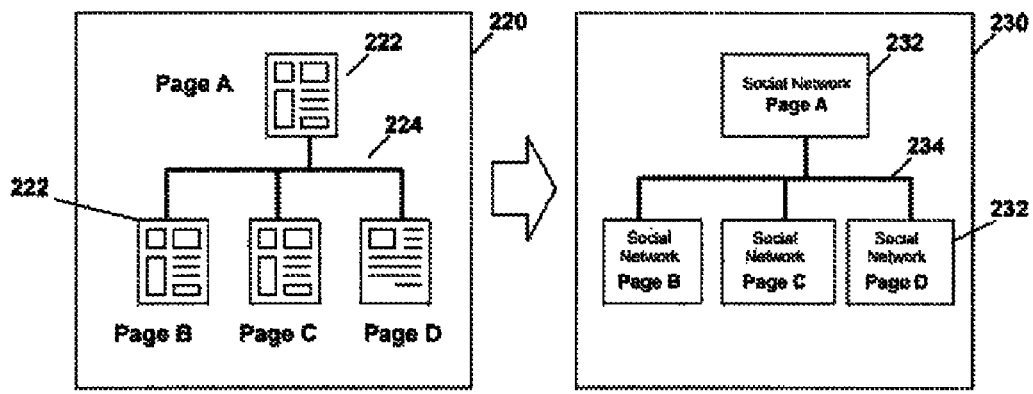
Figure 2C:
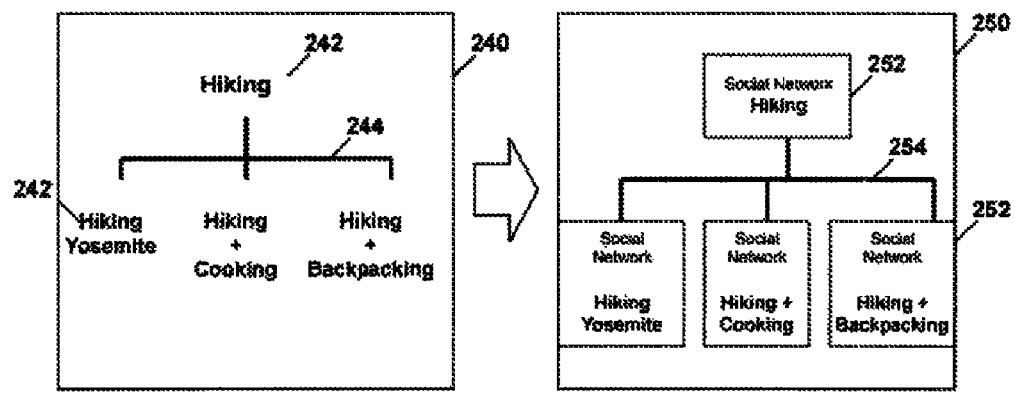
Figure 3A:
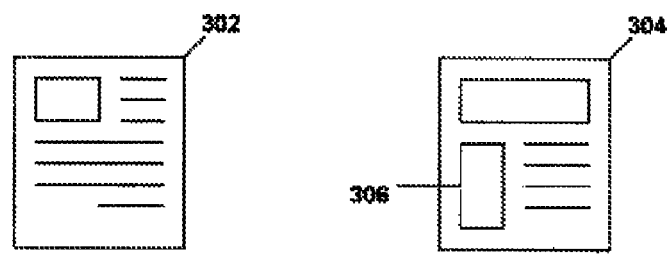
FIGS. 3a-3c are diagrammatic views showing interactor-enabled content, FIG. 3a showing the difference between an interactor-enabled content page and conventional content pages.
Figure 3B:
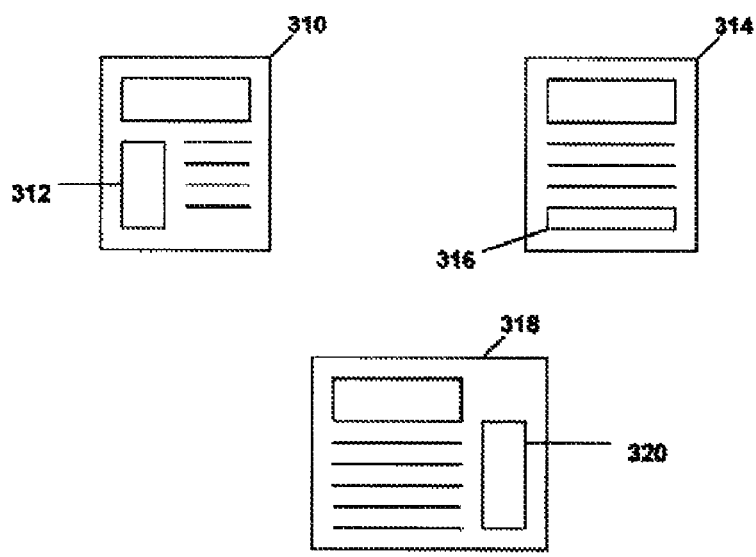
Figure 3C:
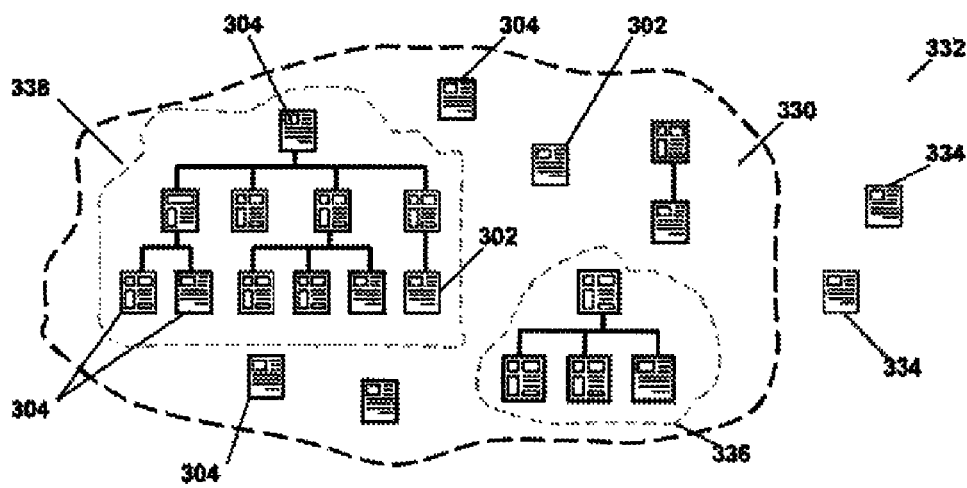
Figure 13:
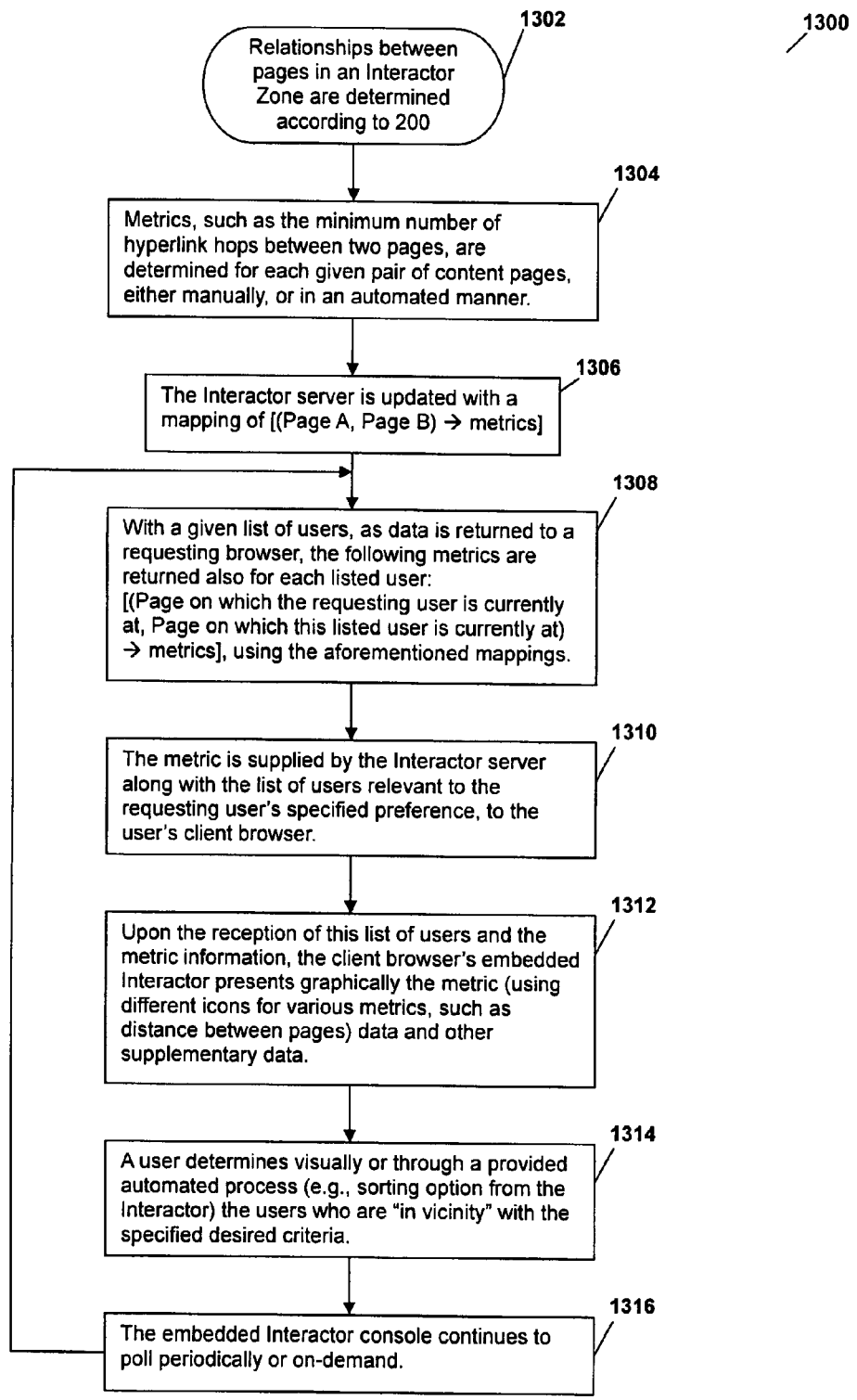
FIG. 13 is a flowchart of a preferred embodiment of a process by which user locale may be calculated and supplied to other users.

Referring to FIG. 13, the interactor server is made aware of the relationship and links between pages in the same interactor zone as described, for example, in FIG. 2. Logical distance or another metric between each pair of pages may be calculated at 1304. That metric may be based on the minimum number of hyperlink hops between a given pair of pages of content within a given interactor zone. The interactor server may be updated with such metrics information at 1306. The format may be [(Page A, Page B)→metric].

Assume that a user U is in the interactor zone and that the user's browser has submitted a request to a web server to access Page A. That page will be loaded together with the interactor client by the interactor server. During this process, the interactor server will include the following for each user displayed in user's U list of "members" with whom user U can interact: [(Page A, "Page BI"), metric] where I is a number from 1 to N, with N being the number of members of the zone that user U can interact with and that appear on user's U interactor console. For a member 1 on page B1, the metric [(Page A, Page B1), metric] is sent to user's interactor client and the interactor list of members that the user can interact with. The information (the metric as well as any other data such as a reference to Page B1) may be displayed at 1308-1312 as part of the GUI associated with each member name in the list.

The user can then determine visually the relation between his/her Page A content and the content member 1 in the list, for example, is currently accessing. The user can determine much like in a physical store who is in the vicinity of the content of page A, much like visually determining who is in the vicinity of a store counter. This determination may also be automated through sort options in the interactor GUI. The user may then make decisions at 1314 as to whom to interact with based on the relationship of the content that he/she is viewing and that which members BI are viewing. This metric information is a very unique capability, that in the case of an eCommerce interactor zone, simulates and brings a physical department store experience to an online store. A user can determine locations of and what each user experiencing the same interactor zone is doing.

The interactor console for the user may continue to update (refresh) at 1316 the user's interactor list, periodically or on demand, as described below for FIG. 9.

Dynamic User Profile

A registered user profile is one key to what he/she represents in an interactor zone. The following is representative example of what a profile might contain, and how a profile may be updated as the user continues to access an interactor zone content and interact with others within the interactor zone.

Figure 14A:
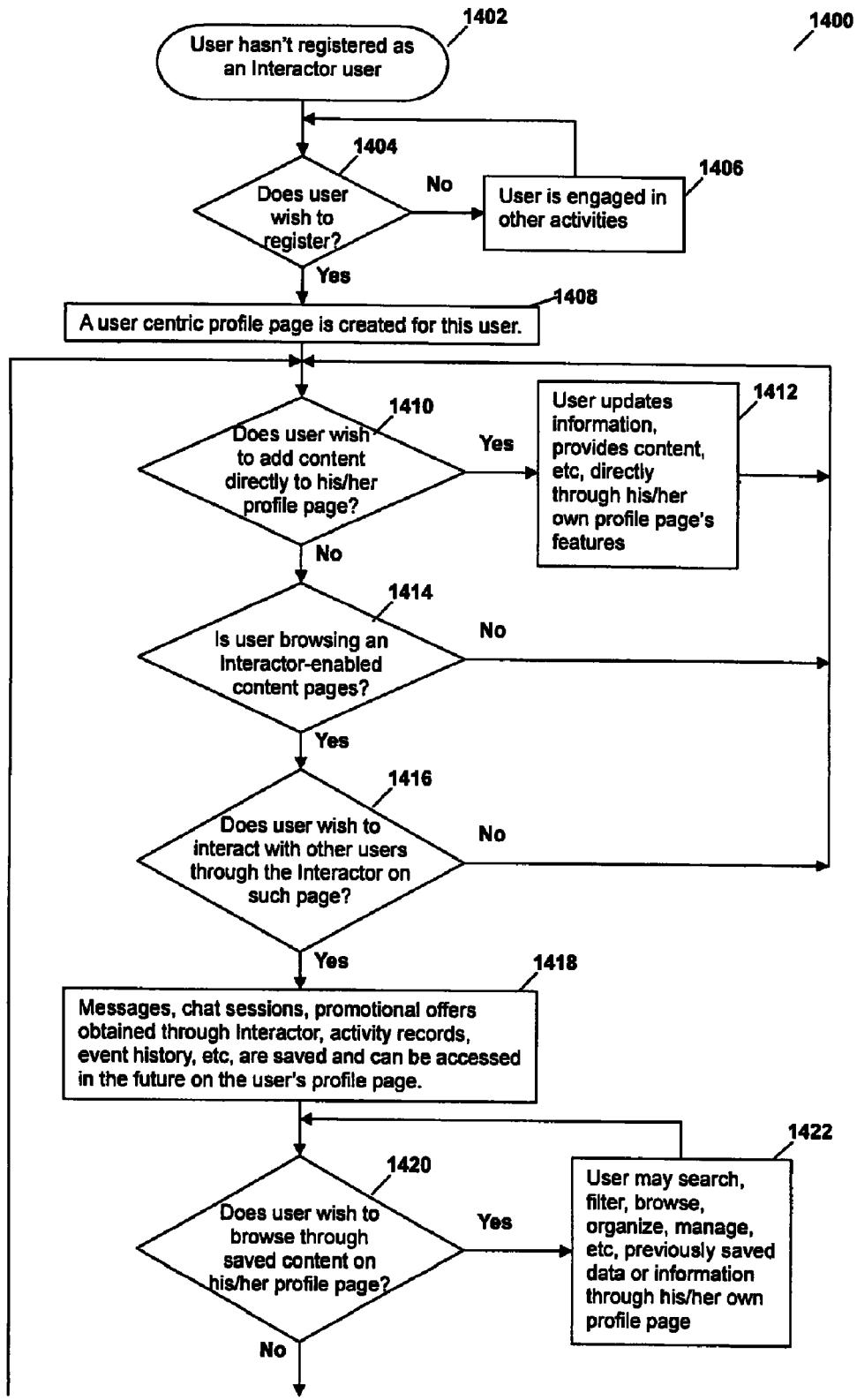
FIG. 14 (FIGS. 14a-14b) comprise a flowchart of a preferred embodiment of a process by which a user profile page may be incrementally augmented to serve as a user-centric page with enriched content.

The dynamic profile of an already registered member will contain a lot of information pertaining to the member's activities in the interactor zone. For example, some of the entries in a snapshot of the member's dynamic profile might be as follows:

A SAMPLE PROFILE SUBSECTION:
Specific Sliver-Interest: Red wine-Cabernet
Online Content accessed in last 30 days: 25 pages—click for list
Online Wine Events attended in the last 30 days: 7—click for detail
Online Content accessed in last 60 days: 77 pages—click for list
Online Wine Events attended in the last 60 days: 25—click for detail
No. of friends that are highly interested in wine events: 23
Average time spent interacting with other attendees per day: 6 minutes
No. of questions received over last 60 days: 200
No. of questions responded to: 55
No. of red wine-Cabernet bottles purchased in the last 14 days: 12—click for details
Knowledge of red wines based on responses to questions: 80%
Ranking for "wine interest": top 25 percentile FIG. 14 illustrates a preferred process 1400 for updating the profile on a regular basis. As shown, a user registers and creates a unique user profile at 1402-1408. At 1410-1412 the user may add content to his/her profile using applications that are part of the user profile page. Examples may be cutting and pasting a chat with another user, adding a bookmark for a content page, or including a reference to content external to the interactor zone.

If the user wishes to interact at 1416 with other users, the content of the interaction such as chat sessions, pages visited, events attended, products purchased, promotional offers received and questions/responses activity by the user may be recorded and included automatically in the user profile page 1418.

At 1420-1422, the user has access to his/her profile and to a set of tools that enable him to browse his profile, as well as to search, edit, organize, etc., the profile.

Figure 14B:
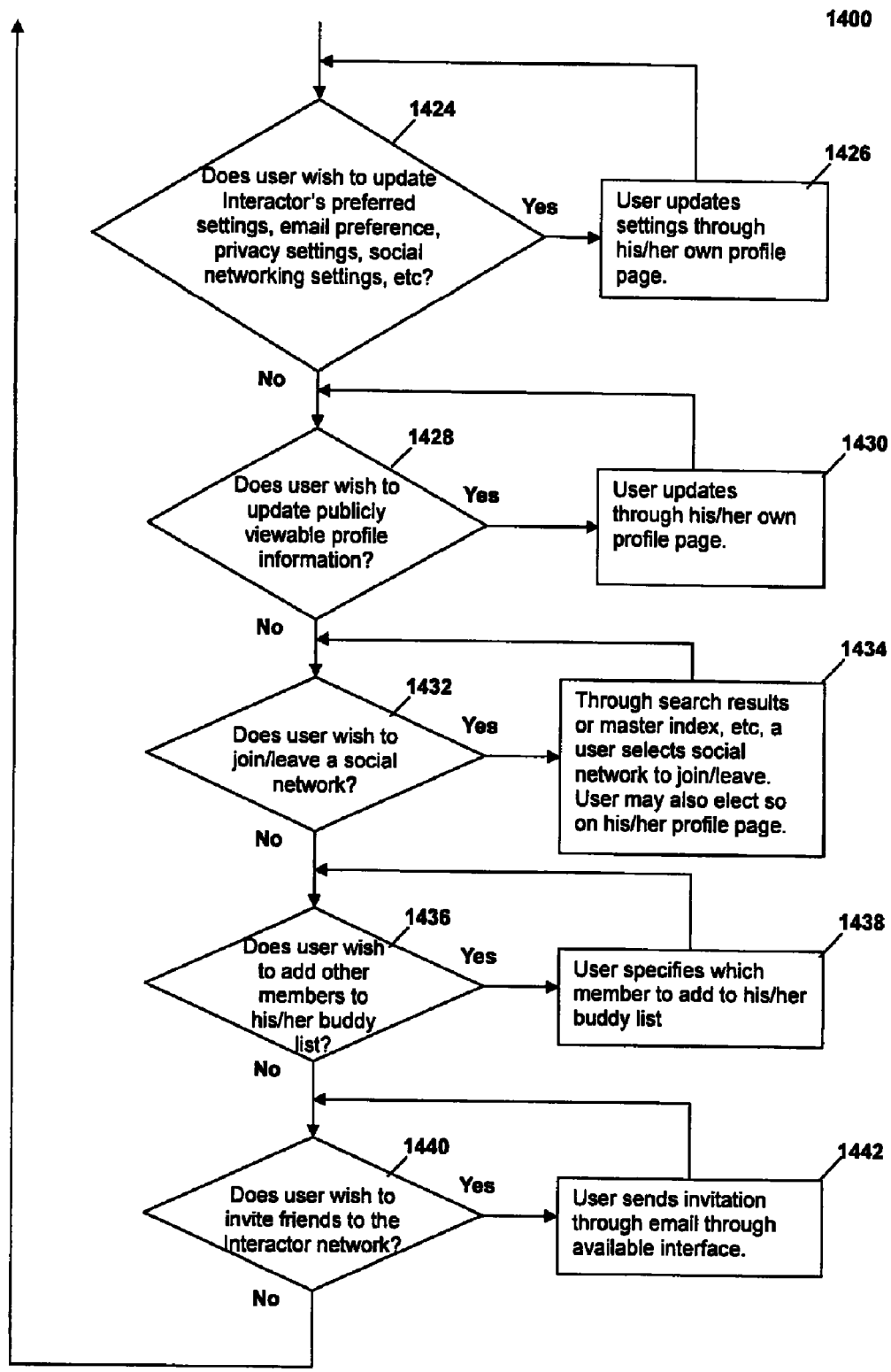

At 1424-1440, FIG. 14b, the user has access to other applications and functions, to update his/her user profile. For example, at 1424 a user may update interactor setting, email preference, privacy settings (who from the interactor zone can access the user and how the user wants to limit his/her universe), etc.

At 1428, the user may edit and update the public component of his/her user profile.

At 1432, the user may join or opt-out of a social network membership. To join a network the user may search a maser index of social networks (MISN at 1124, FIG. 11) to find the appropriate networks to join.

At 1436, the user may add links to others' profiles in his/her profile page and make them buddies. Being a buddy of another user, a user acquires a special status that allows these two users to opt to see each other through the interactor console regardless of the users' localities and by overwriting any other filtering preference.

At 1440, the user can invite friends who are not part of any of the social networks to become members, by composing and sending an email at 1442.

Instant Join 'One Click" Social Network Membership

Figure 15:
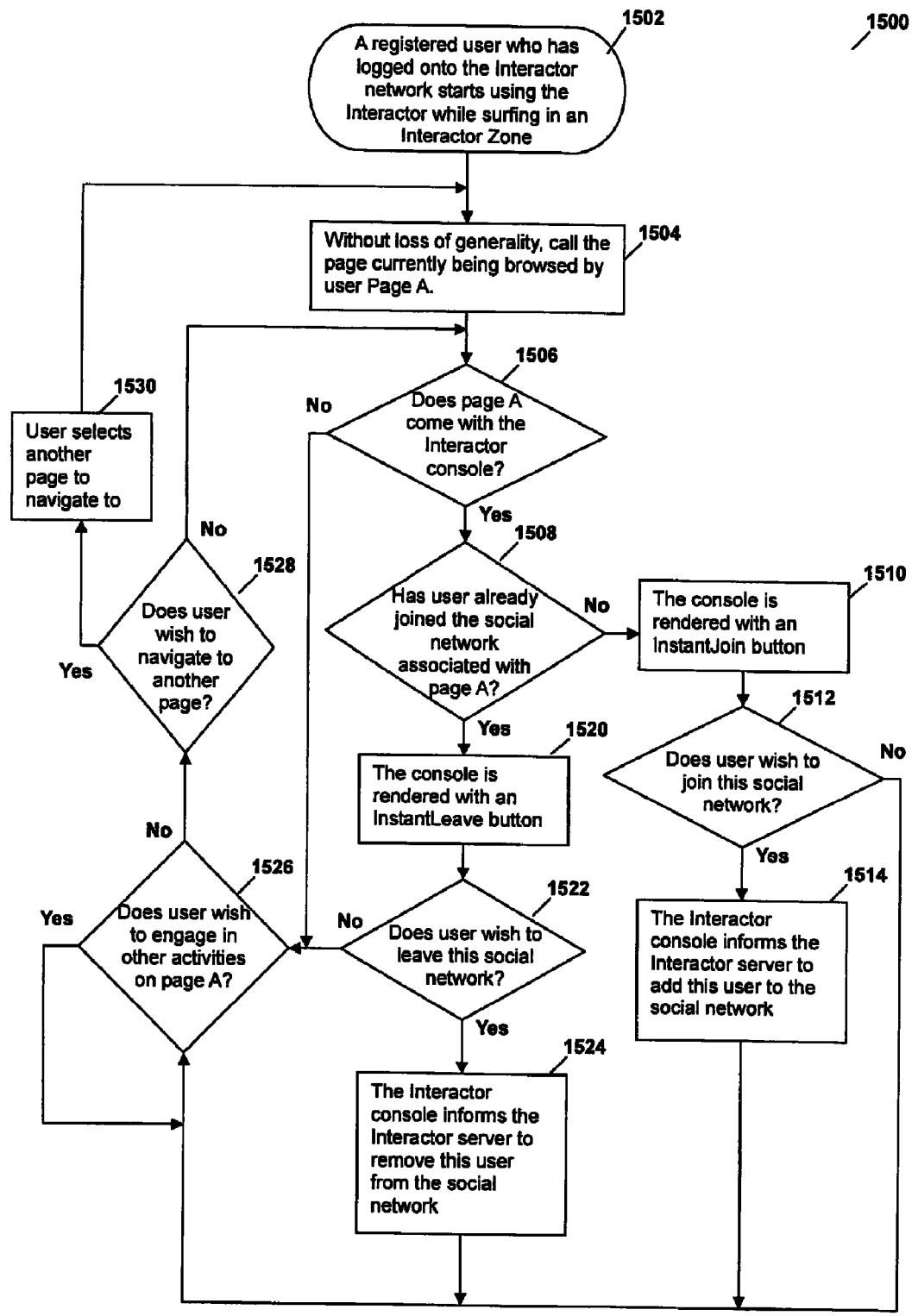
FIG. 15 is a flowchart illustrating a preferred embodiment of an instant join process of the invention by which a user may join/leave a social network by a single click.

As part of the interaction with the content and users in the interactor zone the invention enables a member to join social networks and opt-out of others easily and quickly, right at the corresponding content page with the subject matter of interest. This is done without previously searching for a social network of interests through other means or processes. Joining social networks based on content and activity may be temporary, and, thus, is preferably a very easy process for a user. The invention advantageously affords an instant join, ("InstantJoin") process 1500, as illustrated in FIG. 15. Joining a sliver-interest social network requires registration. Thus, in FIG. 15, a user, with an assumption that the user is registered, is logged in to the Interactor network (surfing within the interactor zone at 1502) and is viewing/browsing some page A at 1504.

At 1506, if page A has an interactor console a user is given an option at 1508 to join a social network associated with page A, and is engaging in another activity at 1526 on page A, the user is presented with an InstantJoin button that is part of the GUI of the interactor console. If the user is not already a member in the social network that is affiliated with page A and clicks that button, he is instantly added to the social network. The interactor then communicates at 1514 to the interactor server to take the appropriate actions to add the user to the social network associated with page A as previously described for processes 1200 and 1400.

If the user is already a member of social network that is affiliated with page A, and the user clicks that button, he/she is instantly removed from the social network (at 1524). The interactor console then communicates at 1524 to the interactor server to take the appropriate actions to delete the user from the social network associated with page A, as described for process 1200.

Group Browsing

Figure 16A:
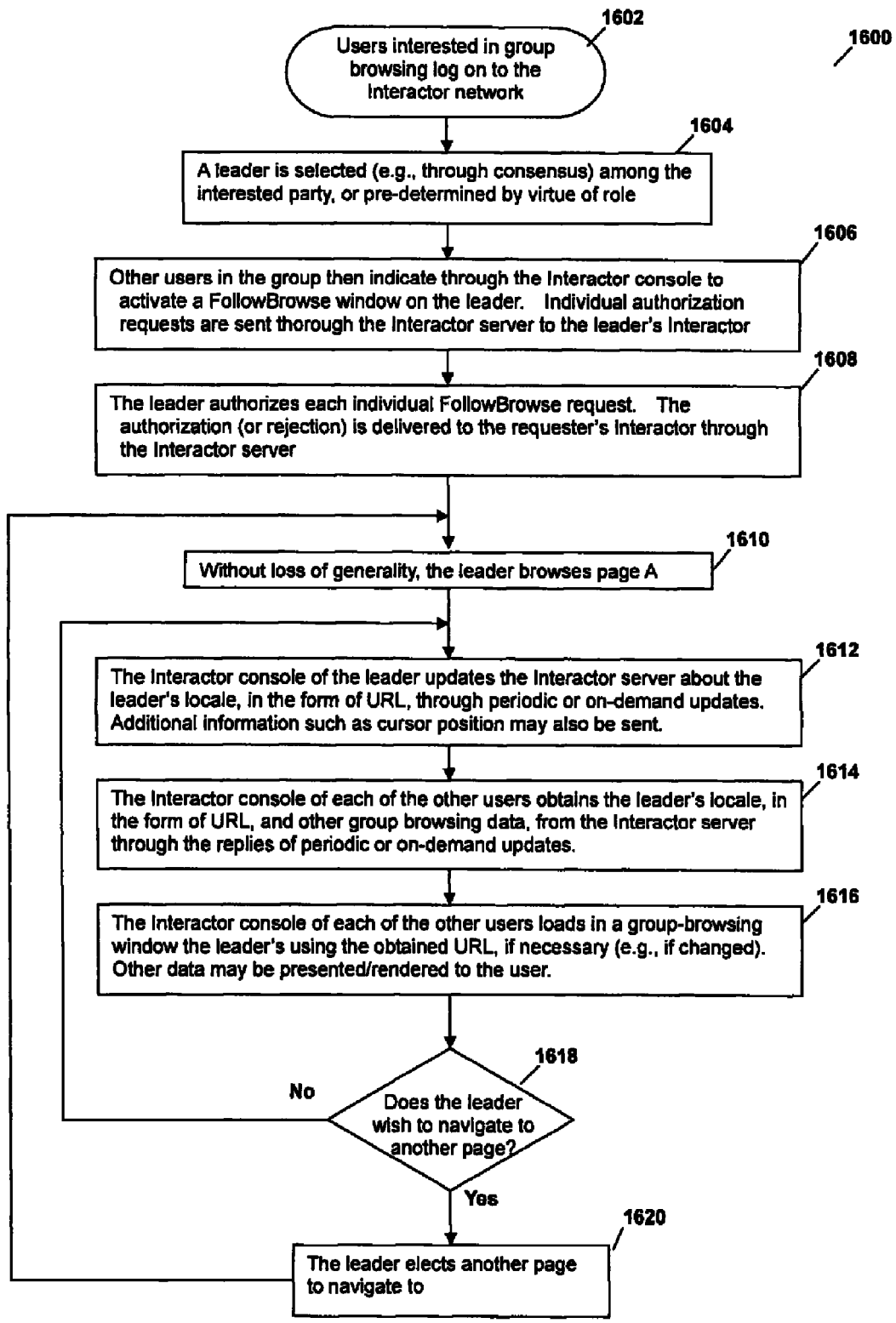
FIG. 16 (FIGS. 16a-16b) comprise flowcharts illustrating preferred embodiments of processes for group browsing using a URL (FIG. 16a) and using an intermediate file format such as jpeg (FIG. 16b)
Figure 16B:
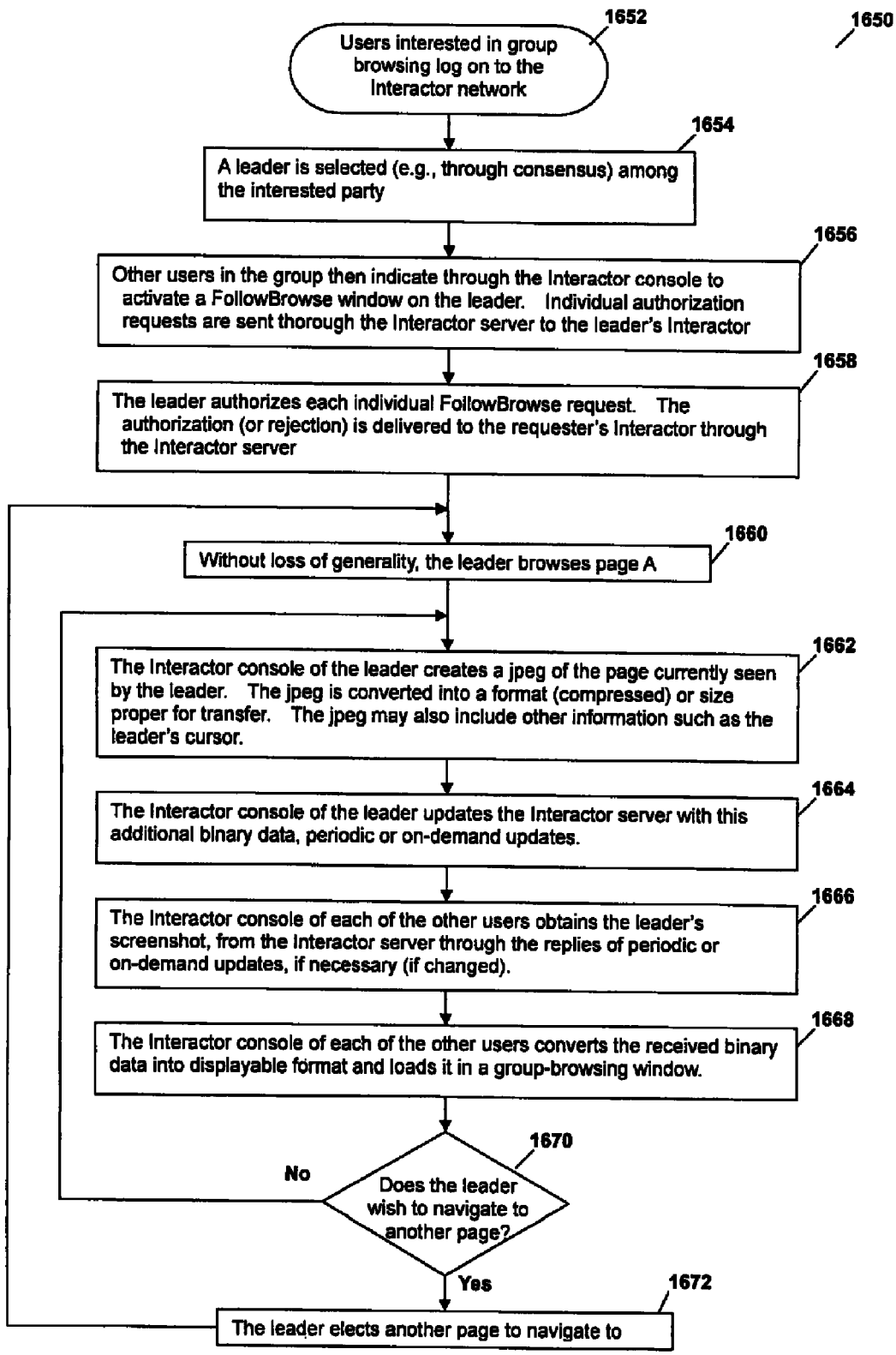

As discussed above, in process 1300 locale-based information on other users is available and displayed, as part of the interactor GUI, to every user surfing/viewing content within an interactor zone and logged in to the interactor. This type of information without the involvement of the interactor GUI and user can facilitate group browsing for any purpose. FIG. 16a and FIG. 16b illustrate examples of two different implementations of group browsing. In the first approach (FIG. 16a), the group views the exact "live" content. The web server delivers to each user in the group an identical reference (such as a URL) to the identical content. In the second approach (FIG. 16b), the group views an image of the "real content". The reason the latter approach is desirable is that the content may be personalized to a user within then group and, thus, not available "live" to others.

The processes 1600 and 1650 of FIGS. 16a and 16b start at 1602 through 1608 for process 1600 and at 1652 through 1658 for process 1650. Referring to the figures, a set of users interested in group browsing may logon at 1602, 1652 to an interactor network (zone). A leader is selected, as by consensus or by pre-determined criteria, or by virtue of a role such as an expert on a subject matter or a shopping concierge for example, or as a result of a scheduled event) at 1604, 1654. All others in the group, besides the leader, may activate a Follow-Browse window through the appropriate GUI at 1606, 1656.

This involves each non-leading user requesting the leader to accept or reject a request to follow his/her browsing activity. The leader accepts (or possibly rejects) the requests from each user in the group to join the group browsing session. The acceptance or rejection is sent to each user's interactor console via the interactor server at 1608, 1658. We now, without loss of generality, assume that the leader is browsing page A of the interactor zone.

Group Browsing with a Common URL (FIG. 16a)

The interactor console of the leader updates the interactor server with information on currently viewed content, i.e., page A URL. Other information related to the group browsing session may be sent to the interactor sever either periodically based on a timer set by the interactor server or by the leader utilizing the appropriate GUI of the interactor, or on demand as a result of the leaders request at 1612.

The leader's locale information (and any other data from Item 1612 that is necessary for the browsing experience) may be transmitted by the interactor server, at 1616, to the interactor console of every user that is part of the group browsing experience. This locale may be in the form of a processed URL (i.e., with all personalization and unnecessary parameters removed). Other information necessary for group browsing such as the leader's cursor location on the screen may also be transmitted along with the URL. As the leader moves from one page to another, the foregoing process may be repeated until the leader ends the group browsing experience.

Group Browsing with a Common Image (e.g. JPEG) (FIG. 16b)

The interactor console of the leader first creates an image, e.g., a JPEG image, of the currently browsed page. This image might include other information necessary for group browsing such as the leader's cursor location on the screen. The interactor console next updates the interactor server with information on currently viewed content as an image at 1662. Other information related to the group browsing session may be sent to the interactor sever either periodically based on a timer set by the Interactor server or the leader utilizing the appropriate GUI of the interactor or on demand as a result of the leaders request at 1664.

The interactor server then transmits the image as well as any necessary data received from the leader's interactor console at 1666 to all the users that have been accepted as part of the group browsing experience. This image and data may be periodically updated or updated on demand. All images received during the group browsing experience by a user may be converted to a presentable format and loaded into the group-browsing window at 1668. As the leader moves from one page to another the process above is repeated until the leader ends the group browsing experience.

The system creates the necessary screens that are web based with an interactive GUI and a plurality of users interacting with the system and with one another. It allows a plurality of users, comprising the social network, to share and experience together content such as, but not limited to, a web site or a presentation or a video which is part of the interactor zone. Furthermore, users can interact with parts or all of the system through a web-enabled telephone or mobile device. In addition, the system runs appropriate software programs to manage the processes described above.

Sliver-Interest Social Networks and Profiles as a Basis for Initiating Interactions The foregoing describes a system and a method for users to access a website, (or content), within an interactor zone on a computer network through a device such as a personal computer, PDA or mobile phone, and to join one or more social network or sliver interest social networks using the interactor console, a real-time client, displayed on the device directly or embedded within the original content. Every user of a plurality of users in the system's database may have a unique profile that describes his/her interests. Every user that is a member may have a profile. In one embodiment of the system and method, the user's profile may be dynamically generated based on level and type activity that the member gets involved in, and based on the interactions with others and the level.

In another embodiment, the system may have an associated community where users access various content or virtual rooms, with each room having content related to an area of human interest. In this embodiment, a user's dynamic profile may reflect the amount of time spent in a virtual room accessing the content pertaining to an area of human interest. In addition, the dynamic profile may also be updated based in the amount of interaction that the user engages in with other user members in the social networks or community.

In a third embodiment the user might be interacting and attending live events and activities. As in the second embodiment, the dynamic profile of a user may be updated and augmented based on events/activities attended and based on levels of interaction with other users and the host during those events and activities.

In all cases the user's profile information is viewable by the first user that is a member of the social network and is looking for content, information and/or products to determine who to contact and interact with to find relevant information, content and/or a product, or if the first user should look for a different members to contact. Another very significant value of the user dynamic profile is that it is also a measurement of the similarity or of "interest-based relationships" distance between users in an interactor zone. This measure can be used by a member to determine who to interact with. In particular, a shorter "interest-based relationships" distance between two users indicates a possibly richer and positive interaction between those two members. This is advantageous to the social networks since structurally they do not necessarily have static links or relationships between members. Rather, relationships are established based on common activity and content.

FIG. 17 describes examples of how a member can determine similarity to another member to obtain an "interest-based relationship" indicator associated with each member. For simplicity we refer to the interest-based relationships as the Degree of Separation (DoS) between two members.

Figure 17A:
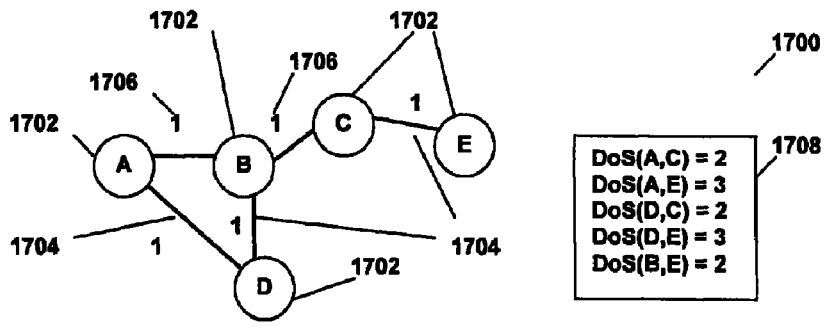
FIG. 17 (FIGS. 17a-17g) comprise diagrammatic views contrasting conventional shortest path (FIG. 17a) and preferred embodiments (FIGS. 17b-17g) of processes for determining Degree of Separation (DoS) among users, FIG. 17b using additional information from a social network (SN) membership list, FIG. 17c using different selected criteria, FIG. 17d assigning different weighting to different criteria, FIG. 17e added dimensions with structured social networks among users, FIG. 17f using other social network-based metrics, and FIG. 17g using the distance between social networks in a hierarchy.

FIG. 17a (1702-1708) shows how DoS is calculated in a traditional social network where relationships are fixed and are determined according to users' list of immediate friends. Note, for example, that relationship or link 1706 between entities B and C has a DoS of "1" since they are directly linked. The DoS between entity D and entity C would be "2", as one traverses the links 1704, 1706 from D to C via entity B. In contrast, FIG. 17b-FIG. 17e illustrate taking account of additional information based on the member's profiles to determine the DoS in accordance with the invention.

Figure 17B:
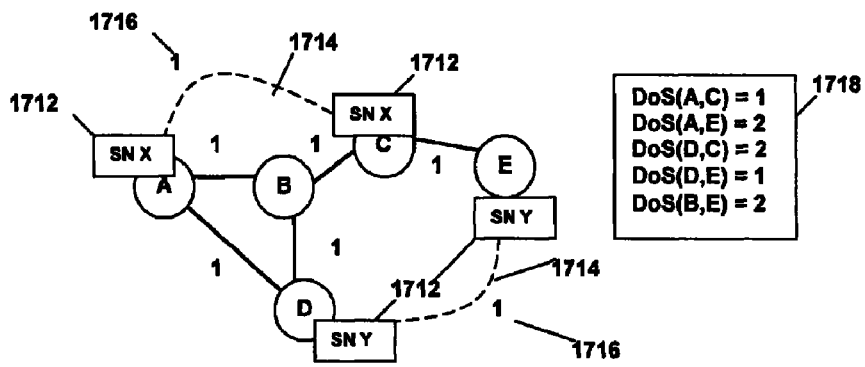

FIG. 17b shows how the various social networks that a user is a member of is used to calculate the DoS. As shown, since D and E are members in social network Y (SN Y) they have a DoS of 1. Thus, DoS(D,E)=1 as indicated at 1718. On the other hand DoS(A,E) is 2 even though in a traditional social network their DoS would be 3 (traverse the path from A to E via B and C). The reason is that DoS (A,E) (in 1718) takes into account that A and C are members in social network X (SN X) and, thus, the DoS (A,C)=1 instead of 2 in a traditional social network setting (1708).

Figure 17C:
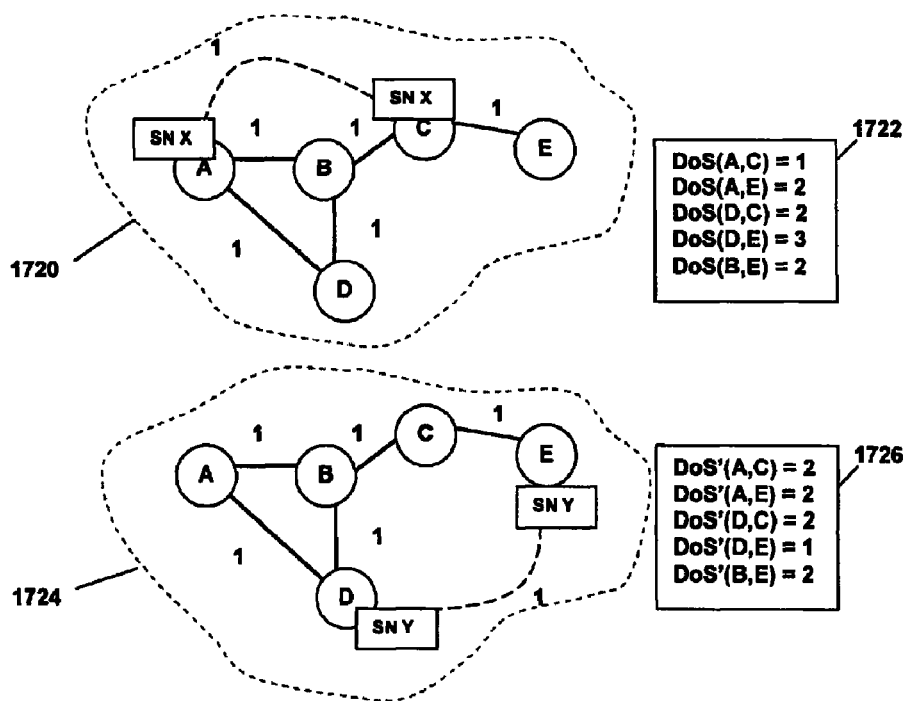

FIG. 17c illustrates another methodology for utilizing additional profile or social network membership information to calculate DoS. The figure at 1720 shows that A and C are members in social network X (SN X). While listing 1726 shows that D and E are members in social network Y (SN Y). Here, a user or a computer program can select which social network memberships to include as additional information. So, for example, if D wants to determine DoS(D,E), DoS(D, E)=3 (1722) while DoS (D,E)=1 (1726). The difference and why it would matter to D concerns the objective of D. Assume that SN X is about cats and SN Y is about dogs. If D wants to interact with someone on a subject related to cats he/she would use DoS(D,E)=3 to determine the "value" that D (relative to others) can bring to that interaction. While if D wants to interact with someone on a matter related to dogs he/she would use DoS(D,E)=1 to determine the "value" that D (relative to others) can bring to the interaction.

Figure 17D:
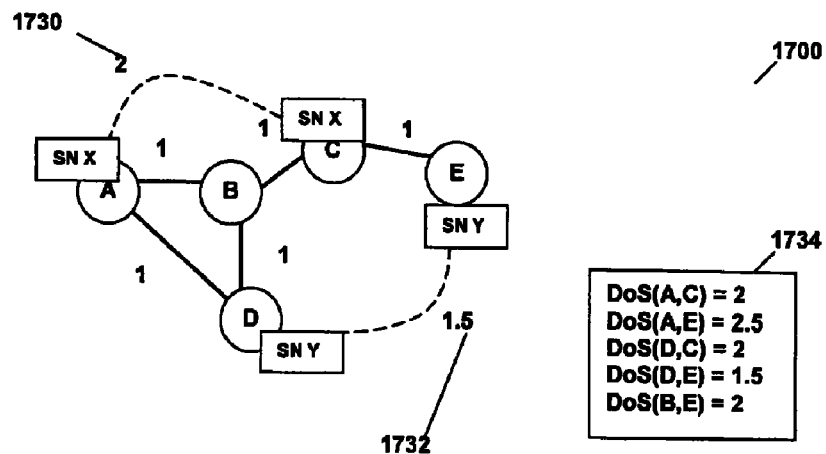

FIG. 17d illustrates another methodology for utilizing additional to calculate the DoS in additional to making use of the traditional notion of DoS as shown in FIG. 17a. In this case the methodology assigns weights to the importance or the value of a social network membership. In the above example SN X was about cats and SN Y was about dogs, so when user D was seeking to interact on issues related to cats the choice was easy. User D gave a weight of zero to SN Y because it was unrelated to cats and a weight of 1 to SN X because user D was seeking interaction on cat related issues. As a result DoS(D,E)=1.

FIG. 17d illustrates the case when SN X and SN Y might be related. In other words, the sliver-interest (or associated content) for SN X is related in a user's mind to the sliver-interest (or associated content) for SN Y. A weight greater than one implies a less valuable interaction. In FIG. 17d user D is a member considers that interacting with a user in SN Y would not help him/her achieve a goal, so he puts a weight of 1.5 on the calculation for anyone that is a member in SN Y, such as E. While D seeing the value of SN X does not add a weight in calculating the DoS for members of SN X such as A. Thus, as shown at 1734, DoS (D,E)=1.5 and DoS(D,A)=1. The weight can be social network-based, i.e., apply to all members in say SN Y, or it could be member dependent. In this latter case D could put a weight corresponding to SN X for C that is different from the weight corresponding to SN X on A.

Figure 17E:
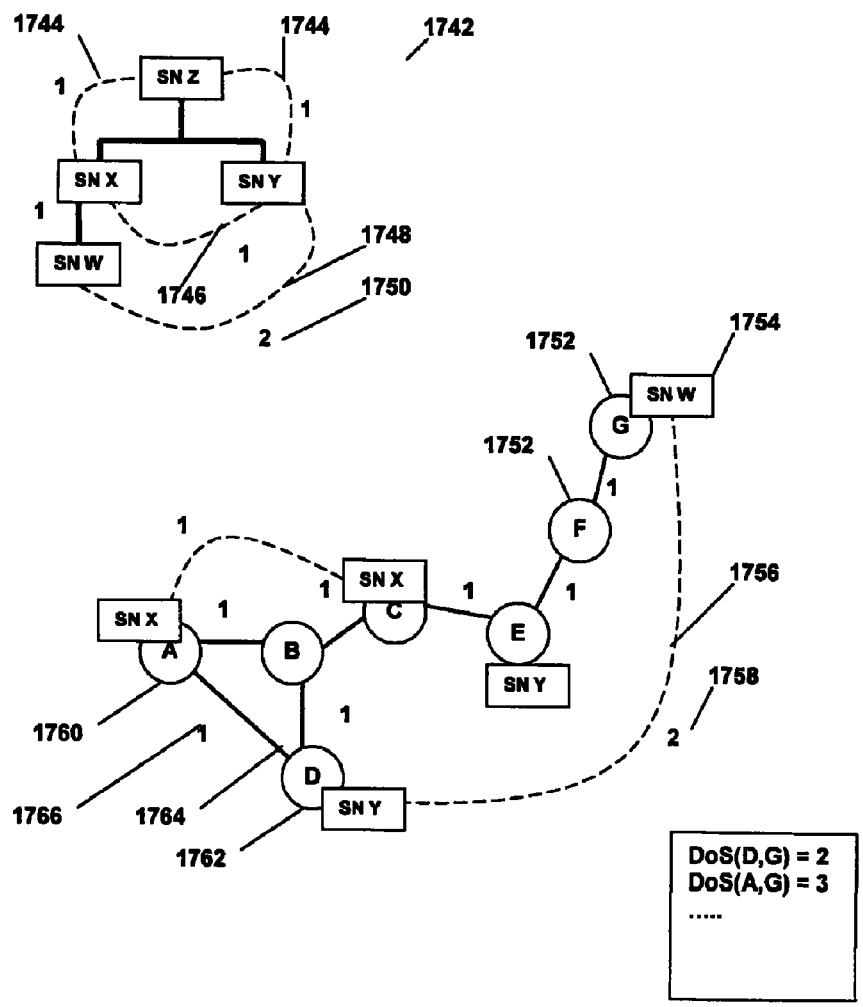

FIG. 17e illustrates yet another example of a methodology for utilizing additional information to calculate the DoS relationships between a set of four social networks shown at 1744-1750. SN W's associated content or interest is a subset of SN X's. For example SN X may be associated with content on perfume in general while SN W may be associated with content on French perfumes specifically. The same may apply to the relationship between SN X, SN Y and SN Z. Specific weights may be assigned to the SNs based on the hierarchical relationship, as indicated at 1744, 1746 and 1748. In the second diagram of FIG. 17e users A and C are members in SN X, users D and E are members in SN Y and user G is a member in SN W. The weights used in calculating the DoS between any of these users are inherited from the weights associated with the hierarchical structure of these social networks (1744, 1746 and 1748). Thus DoS(D (SN Y),G(SN W))=2 (from 1748) and DoS(A (SN X), G(SN W))=3 (from 1748 and

1746). The latter DoS is calculated by traversing from A to D (1766 with a weight of 1 as indicated at 1766) then from D to G (1756 with a weight of 2 as indicated at 1758).

Figure 17F:
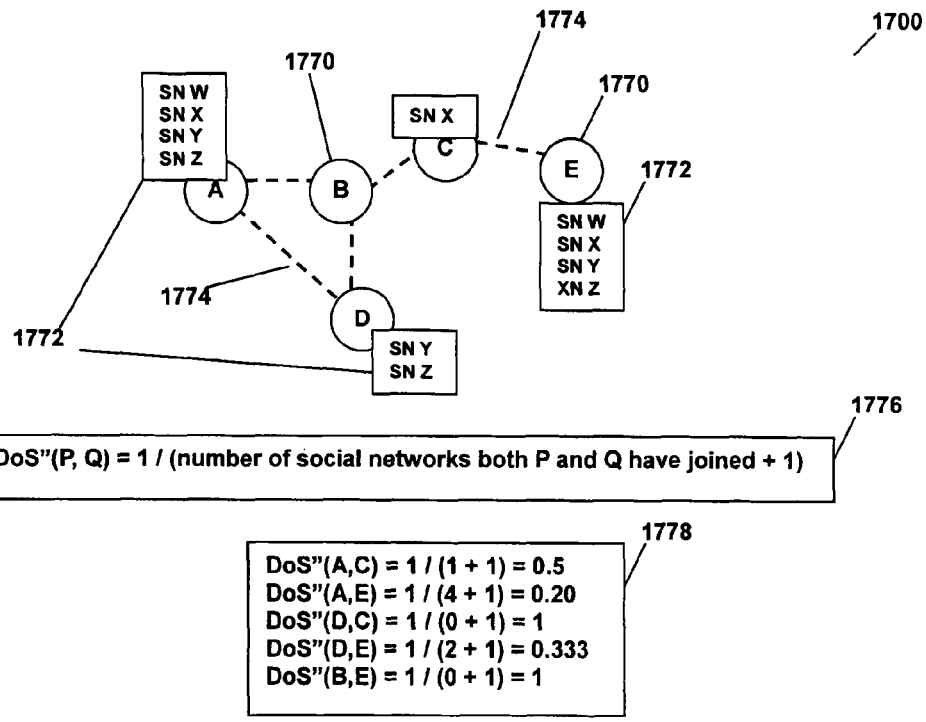

FIG. 17f (1702-1778) demonstrates another methodology that may utilize additional information to calculate the DoS. In this case, the DoS is 1 or less. The smaller the DoS, the more valuable the interaction might be between the two users, since it implies there is more commonality between the two users. The DoS is based on how many social networks the two users have joined and that are common between them. The formula for the calculation of the DoS is shown at 1776. As shown in the top diagram of FIG. 17f, (1770-1774) user A is a member of SN W, SN X, SN Y and SN Z. Furthermore, C is a member of SN X only and E is a member of the same social networks that user A belongs to. Thus DoS(A,C)=1/(4+1)= 0.5 (1778), which is a larger DoS than that between user A and user D. This latter is DoS(A,D)=1/(2+1)=0.033. Thus, member A might prefer to interact with member D over member C. However, the best member for A to interact with is E, DoS (A,E)=0.2 (1778) because they are both members in the same four social networks and have more in common.

Figure 17G:
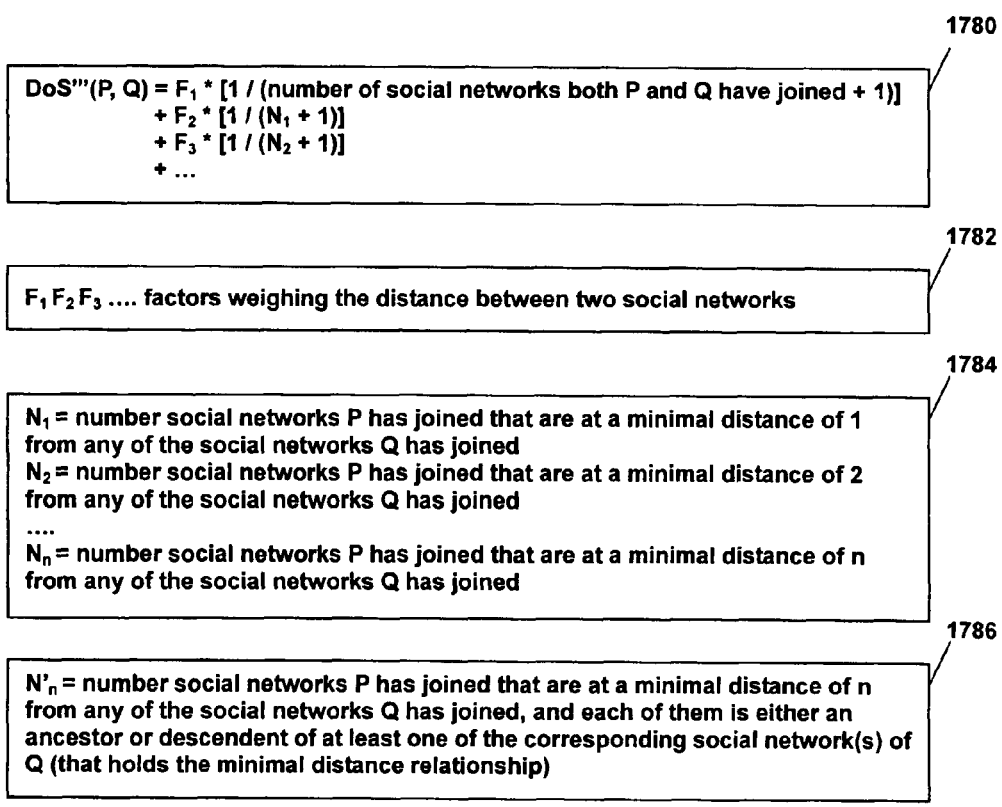

FIG. 17g (1780-1786) illustrates adding yet another or component to the calculation in FIG. 17f. Mainly, in FIG. 17f, member A and member E (1772) are members in the same four social networks, and thus had a DoS(A,E)=0.2 (1778). Here, at 1780-1786, every social network may be treated differently, i.e. we may factor in the hierarchical distance between social networks when calculating the DoS between, say A and E, using weighting factors. The general formula is shown at 1780, DoS(P,Q), which adds weights $F_1, F_2 \ldots$ as weights to the distance between social networks. $N_1, N_2 \ldots$ are factors defined at 1784-1786.

Profiles as a Basis for Personalization

Figure 18:
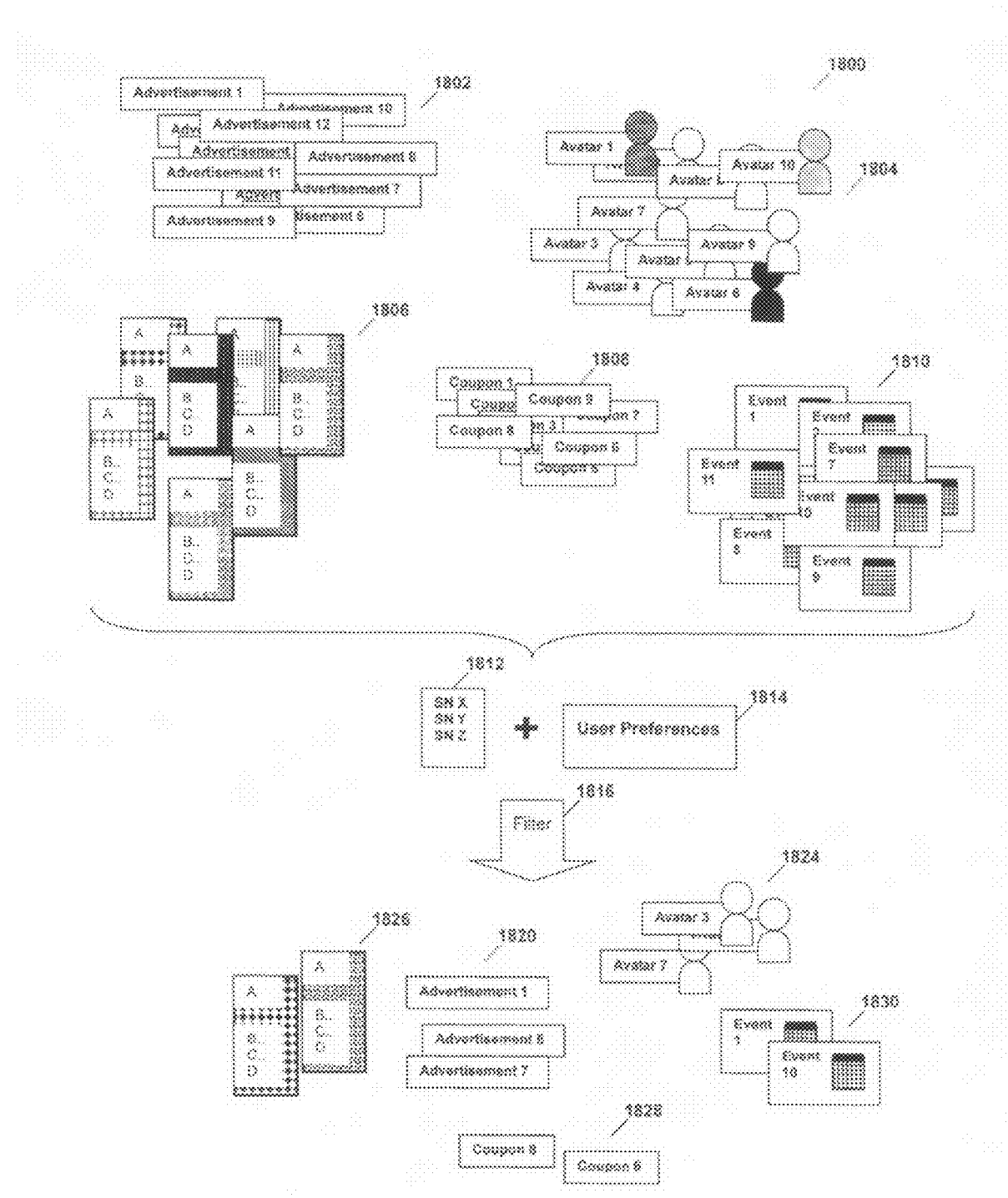
FIG. 18 is a diagrammatic view illustrating how sliver interests may be used to personalize/contextualize advertisements, available options, display skins, avatars, and other personalization parameters.

A content owner might want to target users within an interactor zone while they are using the interactor application or offline with various content. The information in a user profile which includes preferences and social network membership information is ideal for targeting such content in a very precise way that is not possible today. FIG. 18 shows a set of such possible content that could be targeted to members of an interactor zone. This content includes, but not limited to, advertisements (1802), coupons, promotions, invitations to events (1810), other content (1806) and Avatars for user differentiation (1804). Thus the content owner can apply a filter to an advertisement to only those members of SN X or to only members of SN X and SN Y, or maybe to those members of SN X and that have performed a certain amount of interactions or activities the last 10 days, etc. This is indicated at 1812, at 1814 and 1816. Thus, a specific member of SN X, SN Y and SN X with a set of preferences will only receive some of the broadcast content (1826 1820 1830 and 1828). Note 1824 represents a filtered subset of all Avatars (process 1800, FIG. 18) that a content owner makes available to all the members interacting within an interactor zone. Members might choose to represent themselves with Avatars as they browse an interactor zone. These Avatars (more than one possible per user) are an indicator of the users interests. The Avatar can be used for several purposes, as to advertise a member's interests and/or level of expertise, or possibly a user's affiliation with an entity such as the content owner, or an indicator of all the social networks a member has been and is still associated with. Note that FIG. 18 represents an example of what can be personalized, and is not intended to restrict the marketing and personalization possibilities for the invention.

Thus, real-time social networks are great as purchasing tool/application for consumers and great demand generation application for e-commerce sites. In one way, they can be considered an avenue for consumers to get educated about company products, services and offerings from the experts and from trusted users. Of course as stated before real-time social networks are a highly advantageous way to find relevant information or content quickly and efficiently and to interact on-line with others, or discover and form new relationships and renew existing ones anywhere and at anytime. In addition any of the participants and any content they provide is optionally part of the system to enhance and enrich the interaction and the experience of the members of the social network.

While the foregoing description has been with reference to particular embodiments, it will be appreciated that variations and modifications of these embodiments may be made without departing from the principles and spirit of the invention, the scope of which is defined by the appended claims. For instance, while this specification may have presented some embodiments of processes a particular sequence or order of steps, it will be appreciated that this is for illustrative purposes and that other sequences and orders of may be employed.

The invention claimed is:

1. A method of interacting in real-time with online users accessible through a computer network, comprising:
   accessing by a first user a first real-time social network comprising a community of members having a specific predetermined common interest, the first real-time social network being within an interactor zone that includes one or a logical collection of related real-time social networks, the first user accessing the first real-time social network using an interactor client application that allows the first user to communicate in real-time with other online users who are members of said first or another one of said real-time social networks;
   displaying in real-time to the first user identities of other users who are online at the time and who are members of the first or another one of said real-time social networks within said interactor zone and who choose to be identifiable; and
   enabling using the interactor client application real-time interaction by the first user with said selected ones of said other online users.

2. The method of claim 1, wherein said online users access one or more content pages associated with said social networks, and wherein said enabling interaction by the first user with selected ones of said other online users comprises enabling interacting with other online users who are accessing pre-selected ones of said content pages.

3. The method of claim 1, wherein said one or more social networks have content pages associated with a single or with multiple web sites, and wherein said enabling interaction comprises displaying to the first user the content pages being accessed by said other online users.

4. The method of claim 1, wherein said first social network and said other social networks comprise a virtual structure of related content.

5. The method of claim 1 further comprising determining a degree of separation between said first user and said other online users, and said enabling interaction comprises enabling interaction with said selected other online users that are within a predetermined degree of separation.

6. The method of claim 1, wherein said enabling interaction further comprises enabling other online users selected by said first user to display a first content page being displayed by the first user, and enabling real-time communications between said first user and said selected other online users.

7. The method of claim 1, wherein said enabling interaction comprises enabling interaction by said interactor client application and by an interactor server application running on an interactor server of said network.

8. The method of claim 7 further comprising forwarding a profile of the first user to the interactor server, and wherein each of said first and said other online users have a profile that is unique to each such user, the profiles being dynamically variable and having a privacy level setting that enables each user to control access to such user by said selected ones of said other online users.

9. The method of claim 8, wherein said profile is dynamically updated according to the content being accessed.

10. The method of claim 1, wherein said interactor client application comprises one of code or a URL reference to code that is inserted into a content page by the interaction server.

11. The method of claim 1 further comprising an interactor server providing said interactor client application to said other online users to enable real-time interaction by said other online users with the first user.

12. The method of claim 11, comprising enabling by said interactor client application said first user to join said first social network as a member, and updating by said interactor client application a membership list for said first social network at said interactor server.

13. The method of claim 11 further comprising selecting one user as a leader from among said first user and said other online users; activating a group browsing page at the leader; updating by leader the interactor server application on said interactor server with group browsing data of the leader; and supplying said group browsing data to the other online users to enable real-time displaying of content on the leader's group browsing page.

14. The method of claim 13, wherein said selecting comprises selecting more than one leader from among users browsing different pages, and supplying browsing data of each of the leaders to the interactor server to enable users to display one or more browsing sessions.

15. The method of claim 13, wherein said interactor client application of said leader creates an image of the group browsing page, and forwards said image to the interactor server for display to the other online users.

16. The method of claim 1, wherein said interaction comprises one or more of viewing content pages accessed by said other online users, communicating with said other online users, and broadcasting a question to members of other social networks.

17. A method of real-time online interacting with users logged on to social networks in a computer network, the social networks being part of an interactor zone that includes one or a logical collection of related real-time social networks, comprising:

accessing by a first user a first real-time social network in said interactor zone using an interactor client application that allows the first user to communicate in real-time with other online users who are members of said first or another one of said real-time social networks;

displaying in real-time to the first user a list of other users who are online at the time and are accessing social networks within said interactor zone which meet predetermined criteria established by the first user, said displaying comprising displaying content pages being accessed by said other users who choose to be identifiable;

selecting by the first user for interaction selected ones of said other users based upon the content of the content pages; and enabling real-time interaction by said client application between said first user and said selected ones of said other users.

18. The method of claim 17, wherein said predetermine criteria comprise a degree of separation between the first social network and other social networks being accessed by said other users.

19. The method of claim 18, wherein said degree of separation is determined by the relationship between a first content page of said first social network and other content pages of said other social networks.

20. The method of claim 17 further comprising establishing by each user a profile that characterizes such user, and using by content owners said profiles for targeted advertising.

21. The method of claim 17, wherein said interaction comprises communicating in real-time and online with all or a group of said selected other users, and enabling access to the content pages being accessed by the selected other users.

22. A computer network in which a plurality of online users access real-time social networks within an interactor zone that includes one or a logical collection of related real-time social networks, the computer network including a network user device comprising a processor, and a memory, for storing computer programs for controlling the operation of the network user device to perform the steps of:

accessing a selected real-time social network by a first user using an associated interactor client application that enables real-time interaction between online users within said interactor zone who are members of one of said social networks;

displaying in real-time using the interactor client application a list of other users who are online and are accessing one or more of said social networks; and enabling by the interactor client application online real-time interaction between the first user of said user device and other online users accessing other social networks that are within a predetermine locale of the first social network, including providing identities of users on said list of other users who choose to be identifiable, and communicating the content of content pages accessed by the users to said user device.

23. A computer network according to claim 22, wherein said interaction comprises viewing the content pages being accessed by selected ones of said other users, and communicating with said other users.

24. A computer network according to claim 22, further comprising determining degrees of separation between said content pages, and wherein said predetermined locale comprises a predetermined degree of separation.

25. A computer network according to claim 22 further comprising an interactor server hosting an interactor server application communicating with the interactor client application of a said first user to afford said interaction.

* * * * *

(12) INTER PARTES REEXAMINATION CERTIFICATE (1234th)
United States Patent
Aly Assal et al.

(10) Number: US 7,853,881 C1
(45) Certificate Issued: Feb. 17, 2016

(54) MULTI-USER ON-LINE REAL-TIME VIRTUAL SOCIAL NETWORKS BASED UPON COMMUNITIES OF INTEREST FOR ENTERTAINMENT, INFORMATION OR E-COMMERCE PURPOSES

(75) Inventors: Amr Fouad Aly Assal, San Mateo, CA (US); Raymond Marcelino Manese Lim, Los Altos Hills, CA (US); Man-Ho Lawrence Lee, San Jose, CA (US)

(73) Assignee: REAL TIME SOCIAL INVENTIONS, LLC, Boca Raton, FL (US)

Reexamination Request:
No. 95/002,097, Aug. 22, 2012

Reexamination Certificate for:
Patent No.: 7,853,881
Issued: Dec. 14, 2010
Appl. No.: 11/825,021
Filed: Jul. 3, 2007

Related U.S. Application Data

(60) Provisional application No. 60/818,672, filed on Jul. 3, 2006, provisional application No. 60/836,273, filed on Aug. 8, 2006.

(51) Int. Cl.
*G06F 13/00* (2006.01)
*G06F 15/00* (2006.01)
*G06Q 30/02* (2012.01)
*G06Q 10/10* (2012.01)

(52) U.S. Cl.
CPC ............... *G06Q 10/10* (2013.01); *G06Q 30/02* (2013.01)

(58) Field of Classification Search
None
See application file for complete search history.

(56) References Cited

To view the complete listing of prior art documents cited during the proceeding for Reexamination Control Number 95/002,097, please refer to the USPTO's public Patent Application Information Retrieval (PAIR) system under the Display References tab.

*Primary Examiner* — Charles Craver

(57) ABSTRACT

In a multi-user online real-time network in which users access content associated with a plurality of social networks related by common communities of interest, an interactor client application is embedded in content pages accessed by a user, and the user is provided a list of other users and the content pages in the related social networks that they are accessing. The inteactor client application cooperates with an interactor server application on a network server to enable a user to view the content being accessed by multiple selected ones of the other users, and to interact with the other users online and in real time.

Attention is directed to the decision of *Real Time Social Inventions LLC* v. *Yammer Inc*, U.S. Dist Delaware (Wilmington) 1:12cv190; *Real Time Social Inventions LLC* v. *Oracle Corp*, U.S. Dist Delaware (Wilmington) 1:12cv187; *Real Time Social Inventions LLC* v. *Glam Media Inc et al*, U.S. Dist Delaware (Wilmington) 1:12cv186; *Real Time Social Inventions LLC* v. *Facebook Inc*, U.S. Dist Delaware (Wilmington) 1:12cv185; *Real Time Social Inventions LLC* v. *Conduit USA Inc et al*, U.S. Dist Delaware (Wilmington) 1:12cv184; *Real Time Social Inventions LLC* v. *Salesforce.Com Inc*, U.S. Dist Delaware (Wilmington) 1:12cv189 relating to this patent. This reexamination may not have resolved all questions raised by these decisions. See 37 CFR 1.552(c) for *ex parte* reexamination and 37 CFR 1.906(c) for *inter partes* reexamination.

At the time of issuance and publication of this certificate, the patent remains subject to pending reissue application number 13/715,386 filed Dec. 13, 2012. The claim content of the patent may be subsequently revised if a reissue patent is issued from the reissue application.

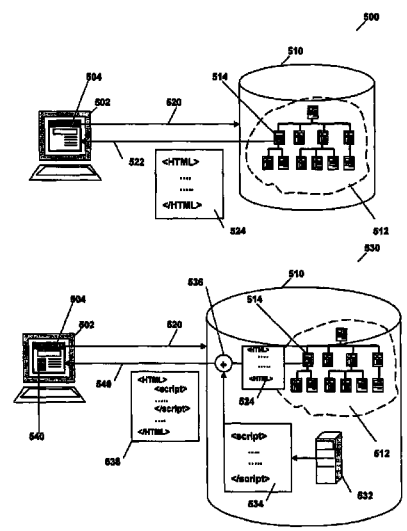

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-25 are cancelled.

* * * * *